(12) United States Patent
Kim et al.

(10) Patent No.: US 10,291,842 B2
(45) Date of Patent: May 14, 2019

(54) DIGITAL PHOTOGRAPHING APPARATUS AND METHOD OF OPERATING THE SAME

(71) Applicant: SAMSUNG ELECTRONICS CO., LTD., Suwon-si (KR)

(72) Inventors: Jae-gon Kim, Hwaseong-si (KR); Sang-hyeon Lim, Hwaseong-si (KR); Seung-ryong Jeon, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 15/058,319

(22) Filed: Mar. 2, 2016

(65) Prior Publication Data

US 2016/0381289 A1 Dec. 29, 2016

Related U.S. Application Data

(60) Provisional application No. 62/183,356, filed on Jun. 23, 2015.

(30) Foreign Application Priority Data

Sep. 18, 2015 (KR) .................. 10-2015-0132612

(51) Int. Cl.
*H04N 7/00* (2011.01)
*H04N 5/232* (2006.01)
(Continued)

(52) U.S. Cl.
CPC ......... *H04N 5/23222* (2013.01); *G06T 7/292* (2017.01); *G06T 7/579* (2017.01);
(Continued)

(58) Field of Classification Search
CPC .... G08G 1/054; G03B 13/36; H04N 5/23212; H04N 5/23238; H04N 5/23232; H04N 5/2258; H04N 5/23296; H04N 5/23222
(Continued)

(56) References Cited

U.S. PATENT DOCUMENTS

2006/0012681 A1 1/2006 Fujii
2008/0218613 A1 9/2008 Janson et al.
(Continued)

FOREIGN PATENT DOCUMENTS

EP 2579572 A1 4/2013
JP 2000032337 A 1/2000
(Continued)

OTHER PUBLICATIONS

Communication dated Apr. 20, 2018, from the European Patent Office in counterpart European Application No. 16814562.1.
(Continued)

*Primary Examiner* — Gims S Philippe
(74) *Attorney, Agent, or Firm* — Sughrue Mion, PLLC

(57) ABSTRACT

A digital photographing apparatus includes: a first camera configured to acquire a wide-angle image including a main subject, a second camera configured to capture a telephoto image having the main subject zoomed in with respect to the wide-angle image; and a processor configured to acquire motion information of the main subject based on the wide-angle image and the telephoto image and configured to determine one of the wide-angle image and the telephoto image as a main image based on the motion information.

32 Claims, 22 Drawing Sheets

(51) Int. Cl.
*H04N 5/225* (2006.01)
*G06T 7/579* (2017.01)
*G06T 7/292* (2017.01)

(52) U.S. Cl.
CPC ....... *H04N 5/2258* (2013.01); *H04N 5/23293* (2013.01); *H04N 5/23296* (2013.01)

(58) Field of Classification Search
USPC .......... 348/218.1, 169, 231.99; 396/89, 125; 359/698; 701/3
See application file for complete search history.

(56) References Cited

U.S. PATENT DOCUMENTS

| | | | |
|---|---|---|---|
| 2008/0219654 A1* | 9/2008 | Border | H04N 5/23212 396/89 |
| 2010/0157107 A1 | 6/2010 | Iijima et al. | |
| 2011/0032387 A1 | 2/2011 | Takahashi | |
| 2012/0026364 A1* | 2/2012 | Kuma | H04N 5/2258 348/231.99 |
| 2012/0069157 A1 | 3/2012 | Nonaka | |
| 2012/0274808 A1 | 11/2012 | Chong et al. | |
| 2013/0308932 A1* | 11/2013 | Nagao | G03B 13/36 396/125 |
| 2014/0132735 A1 | 5/2014 | Lee et al. | |
| 2014/0307101 A1 | 10/2014 | Cobb et al. | |
| 2014/0336848 A1* | 11/2014 | Saund | G08G 1/054 701/3 |
| 2014/0376887 A1 | 12/2014 | Tijssen et al. | |
| 2015/0077591 A1 | 3/2015 | Fujiwara | |
| 2015/0146011 A1* | 5/2015 | Tsubusaki | H04N 5/23296 348/169 |
| 2015/0146029 A1* | 5/2015 | Venkataraman | H04N 5/23232 348/218.1 |
| 2015/0172561 A1 | 6/2015 | Lee et al. | |
| 2015/0226934 A1* | 8/2015 | Iwasaki | G03B 13/36 359/698 |
| 2017/0099436 A1* | 4/2017 | Ono | H04N 5/23238 |
| 2017/0223261 A1* | 8/2017 | Shimizu | H04N 5/23212 |

FOREIGN PATENT DOCUMENTS

| | | |
|---|---|---|
| JP | 2006-033224 A | 2/2006 |
| JP | 2013-192184 A | 9/2013 |
| JP | 2013-247543 A | 12/2013 |
| JP | 2014-102342 A | 6/2014 |
| KR | 10-2014-0062801 A | 5/2014 |
| KR | 10-1510105 B1 | 4/2015 |

OTHER PUBLICATIONS

International Search Report and Written Opinion dated Jul. 29, 2016 issued by the International Searching Authority in counterpart International Application No. PCT/KR2016/002847 (PCT/ISA/210/220/237).

* cited by examiner

FIG. 5A
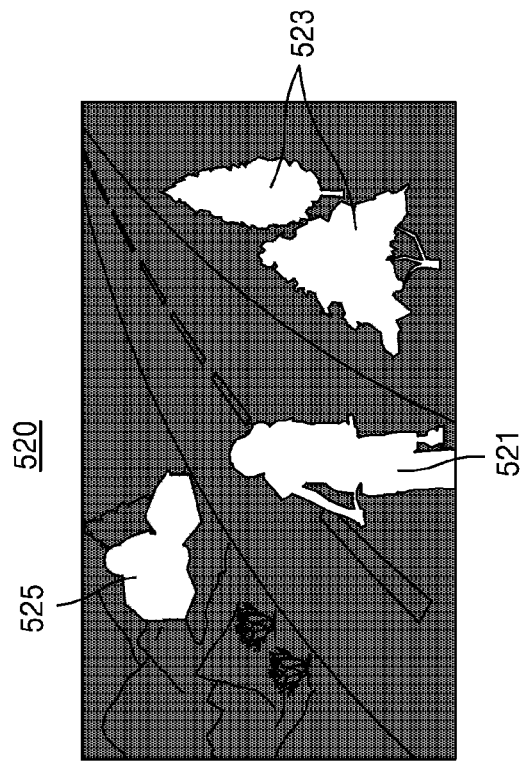
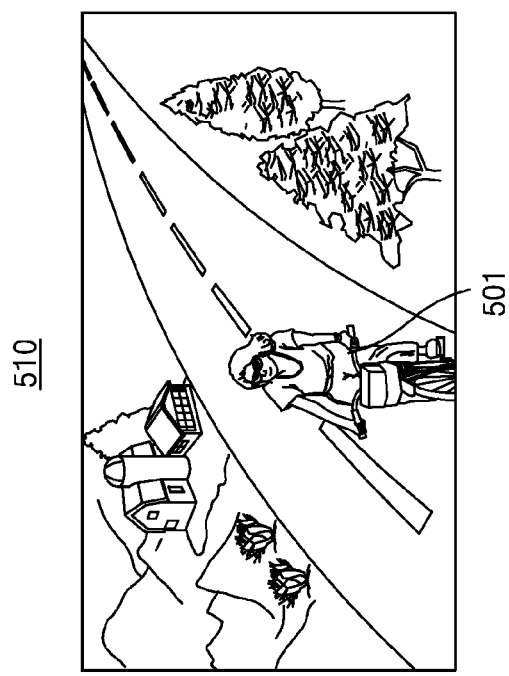

530

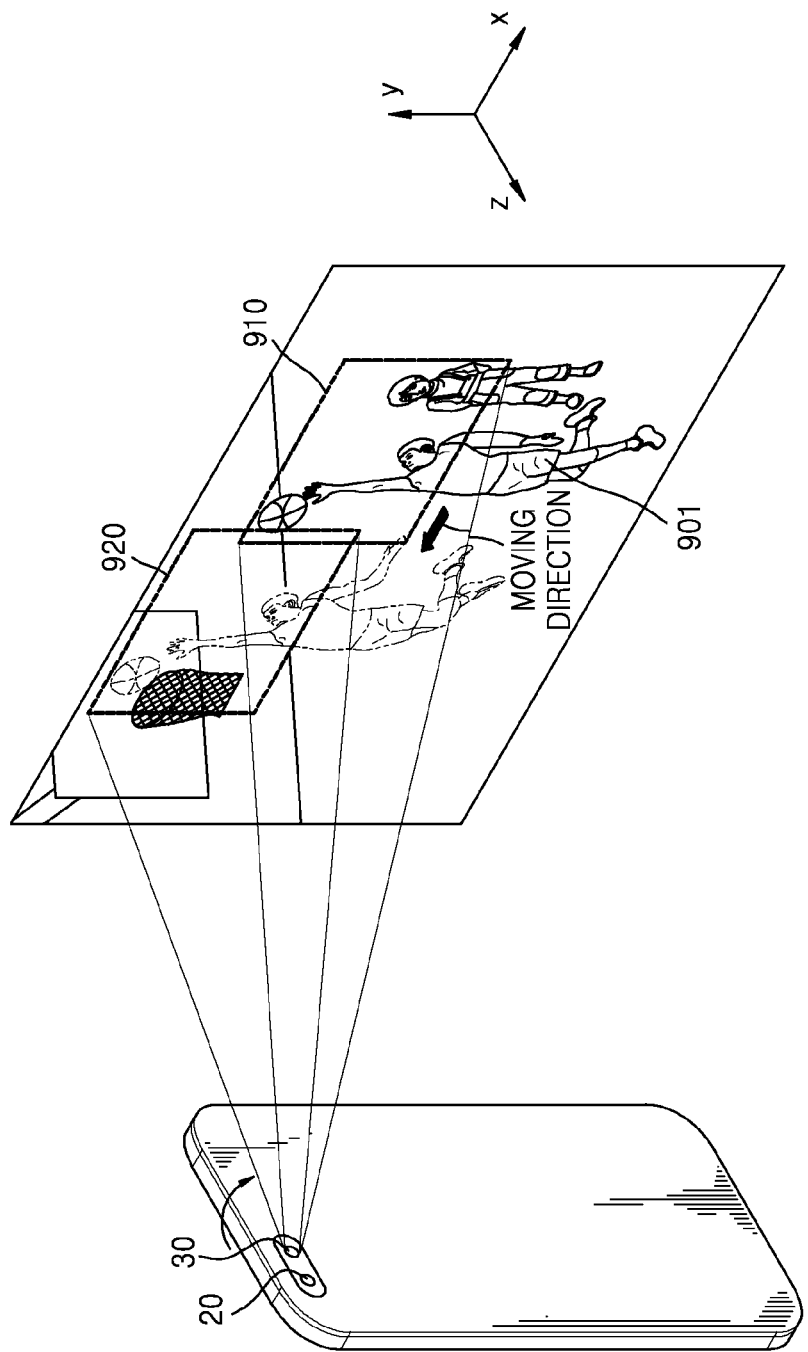

DIGITAL PHOTOGRAPHING APPARATUS AND METHOD OF OPERATING THE SAME

CROSS-REFERENCE TO RELATED APPLICATIONS

This application claims priority from U.S. Provisional Application No. 62/183,356, filed on Jun. 23, 2015, in the U.S. Patent and Trademark Office and Korean Patent Application No. 10-2015-0132612, filed on Sep. 18, 2015, in the Korean Intellectual Property Office, the disclosures of which are incorporated herein by references in their entireties.

BACKGROUND

1. Field

Methods and apparatuses consistent with exemplary embodiments relate to digital photographing apparatuses and methods of operating the same, and more particularly, to a digital photographing apparatus having a plurality of cameras and a method of operating the same.

2. Description of the Related Art

A digital photographing apparatus such as a smartphone, a tablet personal computer (PC), a digital camera, or the like may have a plurality of cameras.

For example, the digital photographing apparatus may include a front camera for photographing in a frontward direction and a rear camera for photographing in a rearward direction with respect to a display screen of a touchscreen.

When photographing is performed using the rear camera included in the digital photographing apparatus, a magnification of an image captured by a user's zooming operation may be changed. Recently, a digital photographing apparatus including two rear cameras having different focal lengths has been used to capture high-quality images at various distances.

SUMMARY

One or more exemplary embodiments provide a digital photographing apparatus and a method of operating the same, in which, when an image is captured using a plurality of cameras, the image is captured with a switchover among the plurality of cameras without a user's manipulation.

One or more exemplary embodiments also provide a digital photographing apparatus and a method of operating the same, in which, by using a plurality of cameras, a motion of a main subject is accurately tracked and an image including the main subject is acquired.

Additional aspects will be set forth in part in the description which follows and, in part, will be apparent from the description, or may be learned by practice of the exemplary embodiments.

According to an aspect of an exemplary embodiment, there is provided a digital photographing apparatus including a first camera configured to capture a wide-angle image including a main subject, a second camera configured to capture a telephoto image zooming in on the main subject, and a processor configured to detect motion information of the main subject based on the wide-angle image and the telephoto image and to determine one of the wide-angle image and the telephoto image as a main image.

The processor may determine a speed of the main subject based on the wide-angle image and the telephoto image and change the main image to the other image of the wide-angle image and the telephoto image based on the speed of the main subject.

The processor may change the main image from the telephoto image to the wide-angle image, if the speed of the main object is directed toward the digital photographing apparatus.

The processor may change the main image from the wide-angle image to the telephoto image, if the speed of the main object is directed away from the digital photographing apparatus.

The processor may acquire a depth map based on the wide-angle image and the telephoto image and detect motion information of the main subject based on the depth map.

The processor may control the second camera to move to a position corresponding to a position of the main subject.

The digital photographing apparatus may further include a display configured to display the main image as a live-view image.

The display may display a sub image, which is the other image of the wide-angle image and the telephoto image, overlappingly with the main image.

The processor may determine a position at which to display the sub image, based on the position of the main subject in the main image.

The digital photographing apparatus may further include a memory configured to store the main image as video.

According to an aspect of another exemplary embodiment, there is provided a method of operating a digital photographing apparatus including a first camera and a second camera including capturing, by the first camera, a wide-angle image including a main subject and capturing, by the second camera, a telephoto image zooming in on the main subject, detecting motion information of the main subject based on the wide-angle image and the telephoto image, and determining one of the wide-angle image and the telephoto image as a main image, based on the motion information.

The method may further include determining a speed of the main subject based on the wide-angle image and the telephoto image and changing the main image to the other image of the wide-angle image and the telephoto image based on the speed of the main subject.

The changing of the main image may include changing the main image from the telephoto image to the wide-angle image, if the speed of the main object is directed toward the digital photographing apparatus.

The changing of the main image may include changing the main image from the wide-angle image to the telephoto image, if the speed of the main object is directed away from the digital photographing apparatus.

The detecting of the motion information of the main subject may include acquiring a depth map based on the wide-angle image and the telephoto image and detecting motion information of the main subject based on the depth map.

The method may further include controlling the second camera to move to a position corresponding to a position of the main subject.

The method may further include displaying the main image as a live-view image.

The displaying may include displaying a sub image, which is the other image of the wide-angle image and the telephoto image, overlappingly with the main image.

The displaying overlappingly may include determining a position at which to display the sub image, based on the position of the main subject in the main image.

The method may further include storing the main image as video.

According to an aspect of another exemplary embodiment, there is provided a digital photographing apparatus including: a first camera configured to capture a wide-angle image including a main subject; a second camera configured to capture a telephoto image having the main subject zoomed in with respect to the wide-angle image; and a processor configured to acquire motion information of the main subject based on the wide-angle image and the telephoto image and configured to determine one of the wide-angle image and the telephoto image as a main image based on the motion information.

The processor may be configured to determine a speed of the main subject based on the wide-angle image and the telephoto image and configured to determine the main image between the wide-angle image and the telephoto image based on the speed of the main subject.

The processor may be configured to determine the wide-angle image being the main image, if the speed of the main subject is greater than a predetermined speed.

The processor may be configured to determine the telephoto image being the main image, if the speed of the main object is less than a predetermined speed.

The processor may be configured to generate a depth map based on the wide-angle image and the telephoto image and configured to acquire the motion information of the main subject based on the depth map.

The processor may be configured to control the second camera to move to a position corresponding to a position of the main subject.

The digital photographing apparatus may further include a display configured to display the main image as a live-view image.

The display may be configured to display a sub image corresponding to the other one of the wide-angle image and the telephoto image, the sub image overlapping with the main image on the display.

The processor is configured to determine a position of the sub image on the display, based on the position of the main subject in the main image.

The digital photographing apparatus may further include a memory configured to store the main image as video.

According to an aspect of another exemplary embodiment, there is provided a method of operating a digital photographing apparatus including a first camera and a second camera, the method including: capturing, by the first camera, a wide-angle image including a main subject; capturing, by the second camera, a telephoto image having the main subject zoomed in with respect to the wide-angle image; acquiring motion information of the main subject based on the wide-angle image and the telephoto image; and determining one of the wide-angle image and the telephoto image as a main image, based on the motion information.

The method may further include: determining a speed of the main subject based on the wide-angle image and the telephoto image; and determining the main image between the wide-angle image and the telephoto image based on the speed of the main subject.

The determining the main image may include determining the wide-angle image being the main image, if the speed of the main object is greater than a predetermined speed.

The determining the main image may include determining the telephoto image being the main image, if the speed of the main object is less than a predetermined speed.

The acquiring the motion information of the main subject may include: generating a depth map based on the wide-angle image and the telephoto image; and acquiring the motion information of the main subject based on the depth map.

The method may further include: controlling the second camera to move to a position corresponding to a position of the main subject.

The method may further include: displaying the main image as a live-view image.

The displaying the main image may include displaying a sub image corresponding to the other one of the wide-angle image and the telephoto image, the sub image overlapping with the main image on a display.

The displaying the sub image may include determining a position of the sub image on the display, based on the position of the main subject in the main image.

The method may further include: storing the main image as video.

According to an aspect of another exemplary embodiment, there is provided an image processing apparatus including: a first camera configured to capture a first image including a subject; a second camera configured to capture a second image including the subject, the first image having a wider field of view (FOV) than that of the second image; and a processor configured to acquire motion information of the subject based on the wide-angle image and the telephoto image and configured to determine one of the first image and the second image as a main image based on the motion information.

The processor may be configured to generate a depth map based on the first image and the second image and configured to acquire the motion information of the subject based on the depth map.

The depth map may include: a first depth map generated at a first point in time; and a second depth map generated at a second point in time, and the processor may be configured to determine a first region of interest (ROI) having the subject at the first point in time and a second ROI having the subject at the second point in time from the depth map.

The processor may be configured to acquire the motion information based on comparison between the first ROI and the second ROI.

The processor may be configured to acquire the motion information based on at least one of comparison with respect to brightness of a pixel between the first and the second ROIs and comparison with respect to a size of the first ROI including the subject and a size of the second ROI including the subject.

The processor may be configured to determine the main image amongst the first and the second images based on at least one of speed of the subject and a moving direction of the subject.

According to an aspect of another exemplary embodiment, there is provided a method of operating a image processing apparatus including a first camera and a second camera, the method including: capturing, by the first camera, a first including a subject; capturing, by the second camera, a second image including the subject, the first image having a wider field of view (FOV) than that of the second image; acquiring motion information of the subject based on the first image and the second image; and determining one of the first image and the second image as a main image, based on the motion information.

The acquiring the motion information may include: generating a depth map based on the first image and the second image; and acquiring the motion information of the subject based on the depth map.

The generating the depth map may include: generating a first depth map at a first point in time; and generating a second depth map at a second point in time, and he acquiring the motion information may include determining a first region of interest (ROI) having the subject at the first point in time and a second ROI having the subject at the second point in time.

The acquiring the motion information may include acquiring the motion information based on comparison between the first ROI and the second ROI.

The acquiring the motion information may include acquiring the motion information based on at least one of comparison with respect to brightness of a pixel between the first and the second ROIs and comparison with respect to a size of the first ROI including the subject and a size of the second ROI including the subject.

The determining the main image may include determining the main image amongst the first and the second images based on at least one of speed of the subject and a moving direction of the subject.

BRIEF DESCRIPTION OF THE DRAWINGS

The above and/or other aspects the disclosure will become apparent and more readily appreciated from the following description of the exemplary embodiments, taken in conjunction with the accompanying drawings in which:

FIG. 5A is a diagram for describing a depth map acquired by the digital photographing apparatus according to an exemplary embodiment;

FIG. 9 is a diagram for describing a process by which the digital photographing apparatus changes a direction of a second camera based on a moving direction of a main subject, according to an exemplary embodiment;

DETAILED DESCRIPTION

Figure 1:
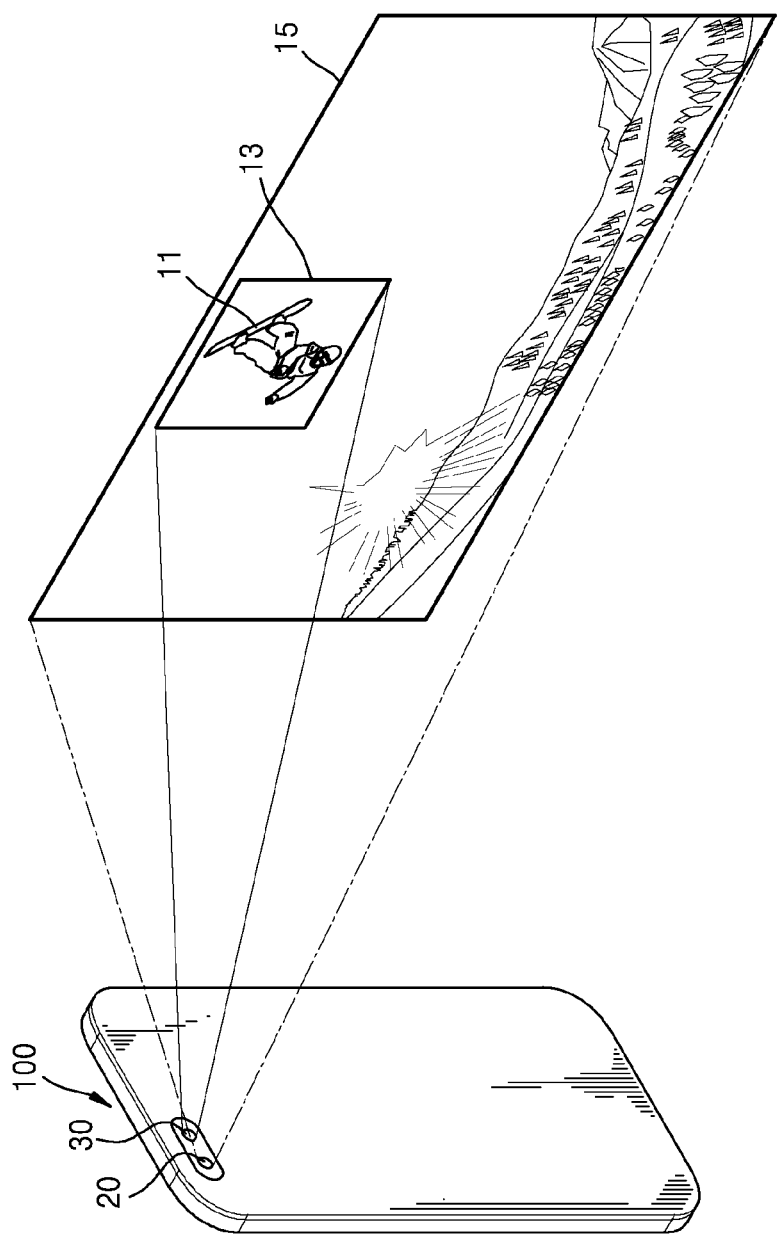
FIG. 1 is a diagram for describing an operation of a digital photographing apparatus, according to an exemplary embodiment.

The terms used in the present disclosure will be described briefly and exemplary embodiments will then be described in detail.

The terms used in the present disclosure are those general terms currently widely used in the art in consideration of functions in regard to the inventive concept, but the terms may vary according to the intention of those of ordinary skill in the art, precedents, or new technology in the art. Also, specified terms may be selected by the applicant, and in this case, the detailed meaning thereof will be described in the detailed description of the inventive concept. Thus, the terms used in the present disclosure should be understood not as simple names but based on the meaning of the terms and the overall description of the inventive concept.

It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

The exemplary embodiments will be described with reference to the accompanying drawings in such a manner that the exemplary embodiments may be easily carried out by a person of ordinary skill in the art. However, the inventive concept may be implemented in various forms and is not limited to the exemplary embodiments. In addition, descriptions of well-known functions and constructions will be omitted for clarity and conciseness, and similar reference numerals are assigned to similar elements throughout the specification. Expressions such as "at least one of," when preceding a list of elements, modify the entire list of elements and do not modify the individual elements of the list.

Herein, a digital photographing apparatus may include at least one of a smartphone, a tablet personal computer (PC), a video phone, an electronic-book (e-book) reader, a desktop PC, a laptop PC, mobile medical equipment, a camera, and a wearable device (e.g., a head-mounted device (HMD) such as electronic glasses, a smart watch, or the like).

Hereinafter, exemplary embodiments will be described with reference to the accompanying drawings.

FIG. 1 is a diagram for describing an operation of a digital photographing apparatus 100 according to an exemplary embodiment.

The digital photographing apparatus 100 may include a plurality of cameras and acquire an image by using the plurality of cameras. The digital photographing apparatus 100 may include a smartphone, a tablet PC, a camera, a wearable device, and so forth. The digital photographing apparatus 100 may further include an element capable of generating an image by photographing a subject by using a lens and an image sensor included therein.

The digital photographing apparatus 100 may include a plurality of cameras. Herein, the camera refers to an element including at least one lens and image sensor and acquiring an image signal by using the image sensor. The camera may be included in the digital photographing apparatus 100 or may be configured as a separate detachable device. The digital photographing apparatus 100 may capture a still image including a panoramic image, a continuous shot image, or the like, and a moving image or video. The digital photographing apparatus 100 according to an exemplary embodiment may include a first camera 20 that acquires a wide-angle image 15 including a main subject 11 and a second camera 30 that acquires a telephoto image 13 zooming in on the main subject 11.

Referring to FIG. 1, the first camera 20 captures an image showing a wider range than the second camera 30. That is, the first camera 20 may provide a wider field of view (FOV) than the second camera 30.

The first camera 20 acquires the wide-angle image 15 including subjects at various distances as well as the main subject 11. Herein, a distance refers to a distance from the digital photographing apparatus 100 to a subject. The first camera 20 may provide, for example, a FOV of from about 30° to about 80°. The first camera 20 may acquire an image having a deep depth of field (DOF). In other words, the first camera 20 may acquire an image in which the main subject 11, another subject having a distance different from that of the main subject 11, and a background are shown clearly at the same time.

The second camera 30 acquires the telephoto image 13 including the main subject 11. The second camera 30 may provide, for example, a FOV ranging from about 10° to about 30°. The second camera 30 acquires an image having a shallow depth. That is, the second camera 30 acquires an image in which the main subject 11 appears clear and another subject having a distance different from that of the main subject 11 and the background are shown unclearly.

Referring to FIG. 1, the second camera 30 focuses on the main subject 11 included in the wide-angle image 15 and acquires the telephoto image 13 in which the main subject 11 is shown enlarged compared to the wide-angle image 15.

The second camera 30 may be moved to track the main subject 11. That is, the second camera 30 tracks the main subject 11 so that the main subject 11 does not deviate from the telephoto image 13 if the main subject 11 moves. The second camera 30 moves up, down, to the left, or to the right by using a piezo motor or is tilted in a desired direction for moving along with the main subject 11. For example, the second camera 30 may move like an eyeball to track the main subject 11 when the digital photographing apparatus 100 does not move. The second camera 30 may include an eye-cam.

According to an exemplary embodiment of the present disclosure, the first camera 20 may include a wide-angle lens and the second camera 30 may include a telephoto lens.

The wide-angle lens included in the first camera 20 has a shorter focal length than the telephoto lens included in the second camera 30. Herein, the focal length refers to a distance from a center of a lens to an image sensor. The wide-angle lens included in the first camera 20 may be a lens having a focal length of from about 10 mm to about 30 mm. The telephoto lens included in the second camera 30 may be a lens having a focal length of from about 30 mm to about 500 mm.

For example, the focal lengths of the wide-angle lens and the telephoto lens are merely examples, and may be determined in various ways according to the design intent.

The first camera 20 and the second camera 30 may be arranged at the rear surface of the digital photographing apparatus 100. That is, the first and the second camera may be arranged to an opposite surface from the display surface of the digital photographing apparatus 100. Although the first camera 20 and the second camera 30 are arranged in parallel to each other on a rear surface of the digital photographing apparatus 100 in FIG. 1, the exemplary embodiment is not limited thereto.

The digital photographing apparatus 100 may detect/acquire motion information of the main subject 11 based on the wide-angle image 15 and the telephoto image 13.

For example, the digital photographing apparatus 100 may acquire a depth map based on the wide-angle image 15 and the telephoto image 13 that are acquired using the first camera 20 and the second camera 30, respectively.

The digital photographing apparatus 100 acquires information about global motion and local motion of the wide-angle image 15 and the telephoto image 13. Thus, the digital photographing apparatus 100 may acquire a depth map after correcting blur caused by motion of the main subject 11 or hand-shaking in the wide-angle image 15 and the telephoto image 13.

The digital photographing apparatus 100 acquires motion information of the main subject 11 based on the depth map. The digital photographing apparatus 100 determines a moving speed of the main subject 11 based on the motion information of the main subject 11 acquired using the depth map.

Herein, the motion information of the main subject 11 may include a position and a size of the main subject 11.

The position of the main subject 11 may include at least one of a two-dimensional (2D) position and a three-dimensional (3D) position of the main subject 11 in the wide-angle image 15 and the telephoto image 13. The position of the main subject 11 may include a distance between the digital photographing apparatus 100 and the main subject 11. The size of the main subject 11 may include at least one of the 2D size and an actual size of the main subject 11 in the wide-angle image 15 and the telephoto image 13.

The digital photographing apparatus 100 determines one of the wide-angle image 15 and the telephoto image 13 as a main image based on the motion information of the main subject 11. The digital photographing apparatus 100 switches from one of the wide-angle image 15 and the telephoto image 13 to the other of the wide-angle image 15 and the telephoto image 13 based on the motion information of the main subject 11.

Herein, the main image may be a live view image displayed by the digital photographing apparatus 100 on a display (not shown). The main image may be an image captured by the digital photographing apparatus 100 and stored in a memory (not shown). The main image may include a still image and video.

The digital photographing apparatus 100 determines one of the wide-angle image 15 and the telephoto image 13 as a main image without a user's manipulation and determines a switchover between the wide-angle image 15 and the telephoto image 13. Thus, the digital photographing apparatus 100 automatically switches the wide-angle image 15 and the telephoto image 13 therebetween, thereby acquiring an image of the main subject 11 as a live-view image.

A way for the digital photographing apparatus 100 to determine a main image and a way for the digital photographing apparatus 100 to change the main image from one of the wide-angle image 15 and the telephoto image 13 to the other thereof will be described in detail below.

Figure 2:
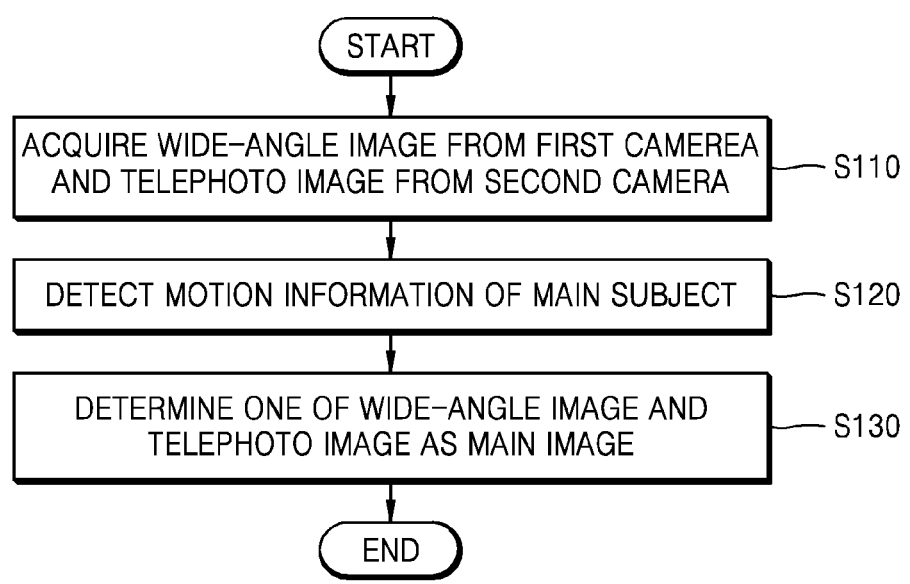
FIG. 2 is a flowchart of a method of operating a digital photographing apparatus, according to an exemplary embodiment.

FIG. 2 is a flowchart illustrating a method of operating a digital photographing apparatus 100 according to an exemplary embodiment.

In operation S110, the digital photographing apparatus 100 acquires a wide-angle image 15 from a first camera 20 and a telephoto image 13 from a second camera 30.

According to an exemplary embodiment, the wide-angle image 15 may be an image including a main subject 11 and the telephoto image 13 may be an image zooming in on the main subject 11.

According to an exemplary embodiment, the digital photographing apparatus 100 may acquire at least two images including the main subject 11 by using the first camera 20 and the second camera 30.

The digital photographing apparatus 100 acquires the wide-angle image 15 including the main subject 11 and subjects at various distances from the first camera 20.

The digital photographing apparatus 100 acquires the telephoto image 13 including the main subject 11 from the second camera 30. The telephoto image 13 may show the main subject 11 enlarged compared to in the wide-angle image 15.

In operation S120, the digital photographing apparatus 100 detects/acquires motion information of the main subject 11 based on the wide-angle image 15 and the telephoto image 13.

According to an exemplary embodiment, the digital photographing apparatus 100 acquires a depth map based on the wide-angle image 15 and the telephoto image 13 that are acquired from the first camera 20 and the second camera 30. The digital photographing apparatus 100 acquires the motion information of the main subject 11 based on the depth map.

In operation S130, the digital photographing apparatus 100 determines one of the wide-angle image 15 and the telephoto image 13 as a main image based on the motion information of the main subject.

According to an exemplary embodiment, the digital photographing apparatus 100 determines one of the wide-angle image 15 and the telephoto image 13, which is capable of displaying the main subject 11 with a desirable composition, as the main image.

For example, if the main subject entirely appears in the telephoto image 13 acquired from the second camera 30, the digital photographing apparatus 100 may determine the telephoto image 13 as the main image.

In another example, if the main subject 11 deviates from the telephoto image 13 acquired from the second camera 30, the digital photographing apparatus 100 may determine the wide-angle image as the main image. In a detailed example, if the main subject 11 is positioned within a short distance (e.g., a distance of about 0.5 m or less) from the digital photographing apparatus 100, the telephoto image 13 may show an enlarged portion of the main subject 11. In this case, the digital photographing apparatus 100 determines the wide-angle image 15 as the main image to show the entire main subject.

Figure 3A:
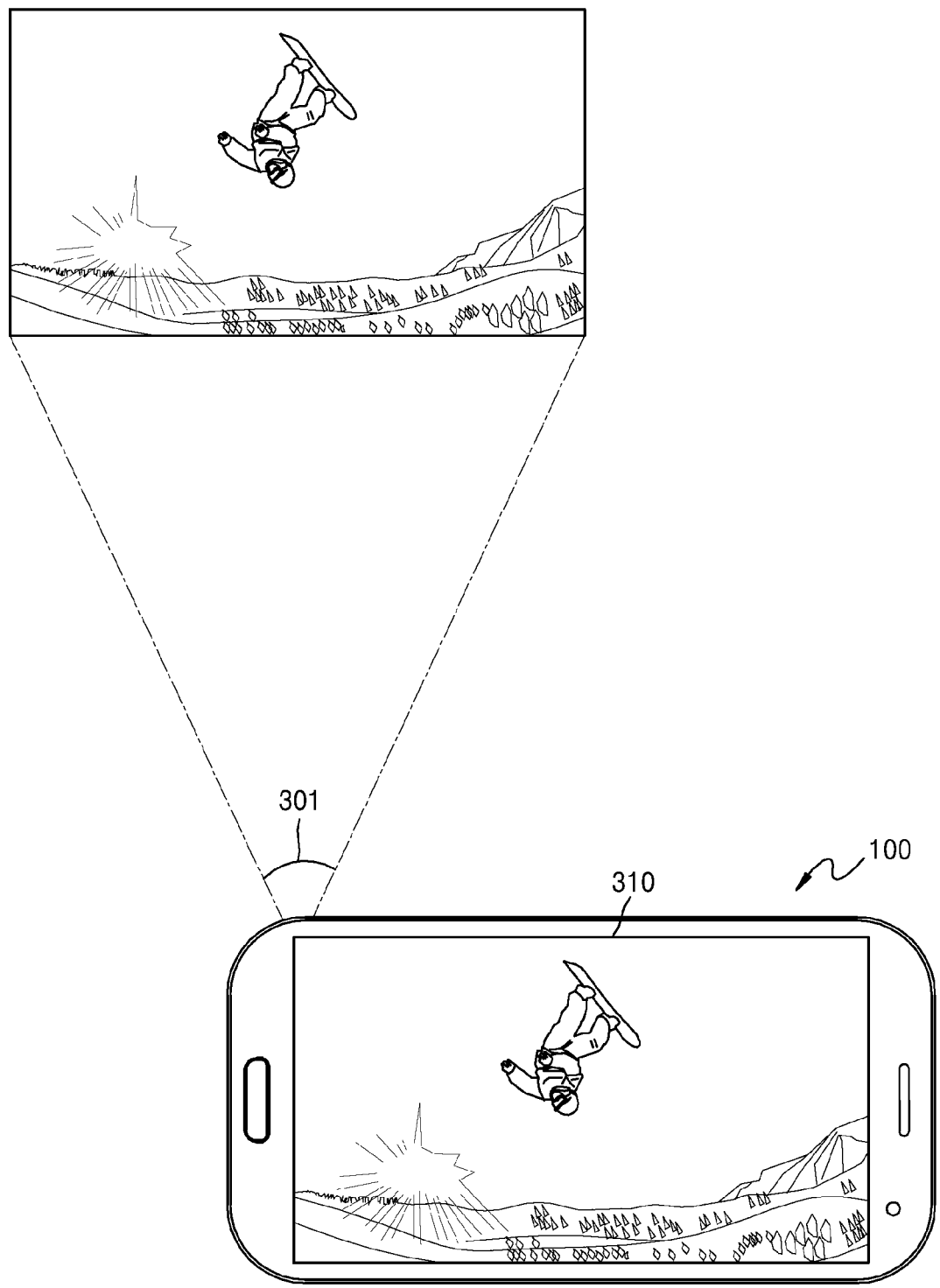
FIG. 3A is a diagram for describing a process by which the digital photographing apparatus acquires a wide-angle image, according to an exemplary embodiment.

FIG. 3A is a diagram for describing a process by which the digital photographing apparatus 100 acquires a wide-angle image 310, according to an exemplary embodiment.

Referring to FIG. 3A, the digital photographing apparatus 100 acquires the wide-angle image 310 by using a first camera 20. For example, when the digital photographing apparatus 100 acquires the wide-angle image 310, the digital photographing apparatus 100 may provide an FOV 301 ranging from about 30° to about 80°.

According to an exemplary embodiment, the digital photographing apparatus 100 displays the wide-angle image 310 as a live-view image when starting photographing.

Figure 3B:
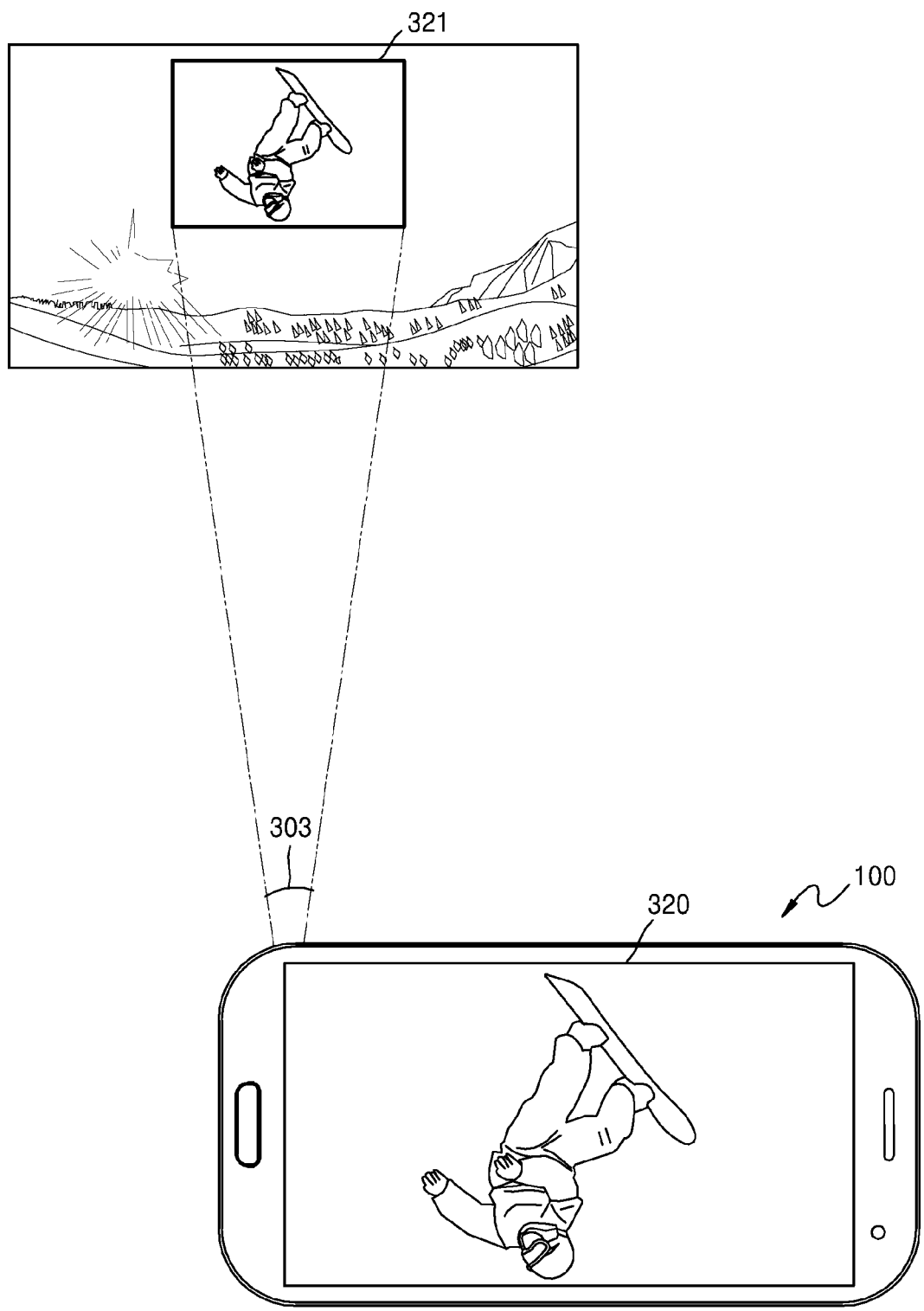
FIG. 3B is a diagram for describing a process by which the digital photographing apparatus acquires a telephoto image, according to an exemplary embodiment.

FIG. 3B is a diagram for describing a process by which the digital photographing apparatus 100 acquires a telephoto image 320, according to an exemplary embodiment.

Referring to FIG. 3B, the digital photographing apparatus 100 acquires the telephoto image 320 by using a second camera 30. The digital photographing apparatus 100 photographs a region 321 including a main subject 11 to acquire the telephoto image 320.

According to an exemplary embodiment, the digital photographing apparatus 100 determines the region 321 including the main subject 11 by using the depth map acquired based on the wide-angle image (310 of FIG. 3A) and the telephoto image 320.

Referring to FIG. 3B, the digital photographing apparatus 100 provides an FOV 303 ranging from about 10° to about 30° when the digital photographing apparatus 100 acquires the telephoto image 320.

If the digital photographing apparatus 100 determines the telephoto image 320 as the main image, the digital photographing apparatus 100 displays the telephoto image 320 as a live-view image. The digital photographing apparatus 100 may also capture video of the telephoto image 320 determined as the main image and store the video in a memory (not shown).

The digital photographing apparatus 100 may enlarge the main subject 11 by optical zooming to such an extent that the main subject 11 does not deviate from the telephoto image 320 and does not cause inconvenience to the user.

The digital photographing apparatus 100 may acquire the telephoto image 320 in which the main subject is shown with an optimal composition. For example, the digital photographing apparatus 100 may control the main subject 11 to be arranged in the telephoto image 320 based on triangulation or a golden ratio. A way for the digital photographing apparatus 100 to acquire the telephoto image 320 including the main subject 11 with the optimal composition is not limited to the foregoing example, and may include a variety of well-known methods.

Figure 4A:
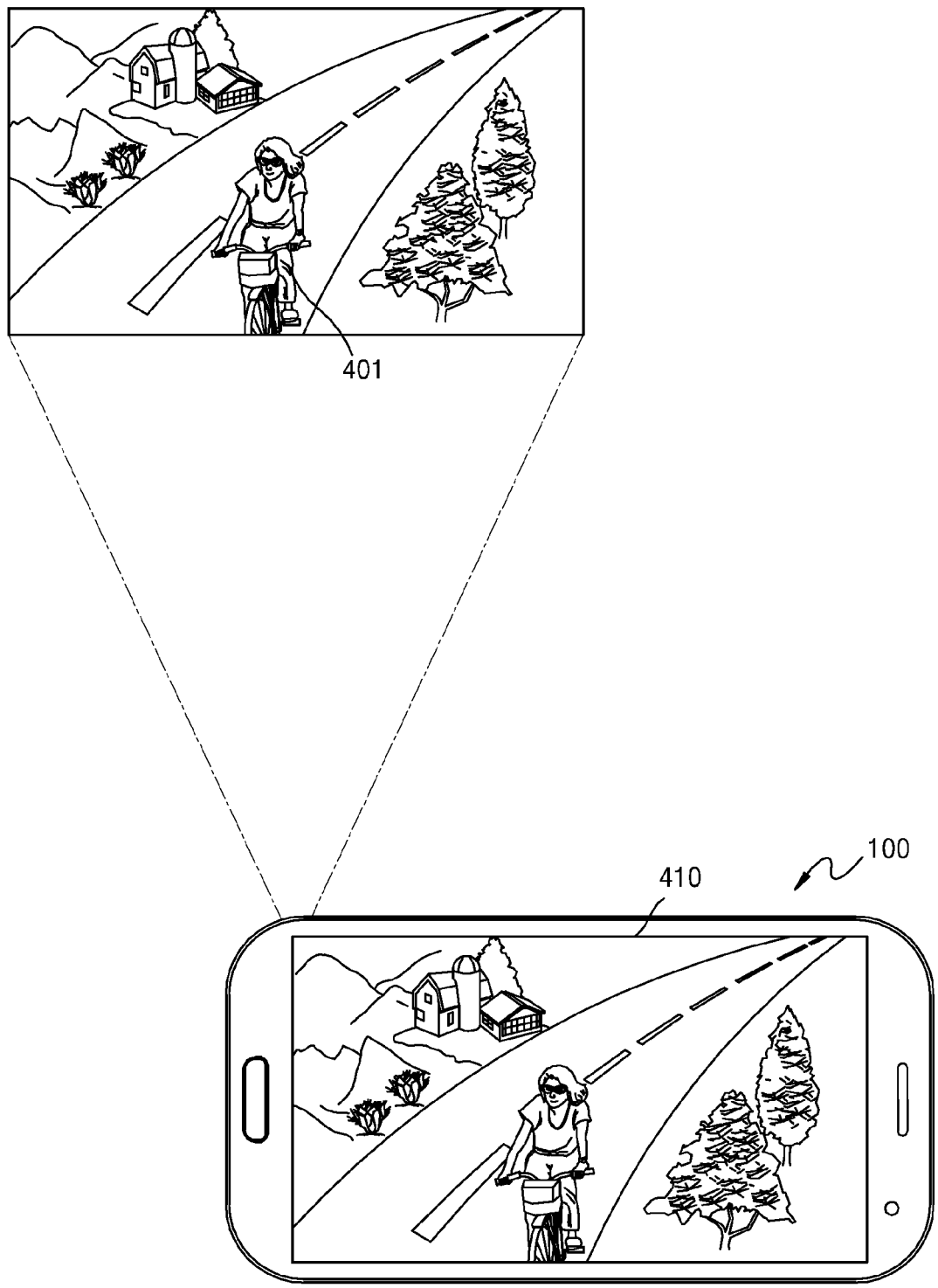
FIGS. 4A and 4B are diagrams for describing a process by which the digital photographing apparatus determines a main image, according to an exemplary embodiment.
Figure 4B:
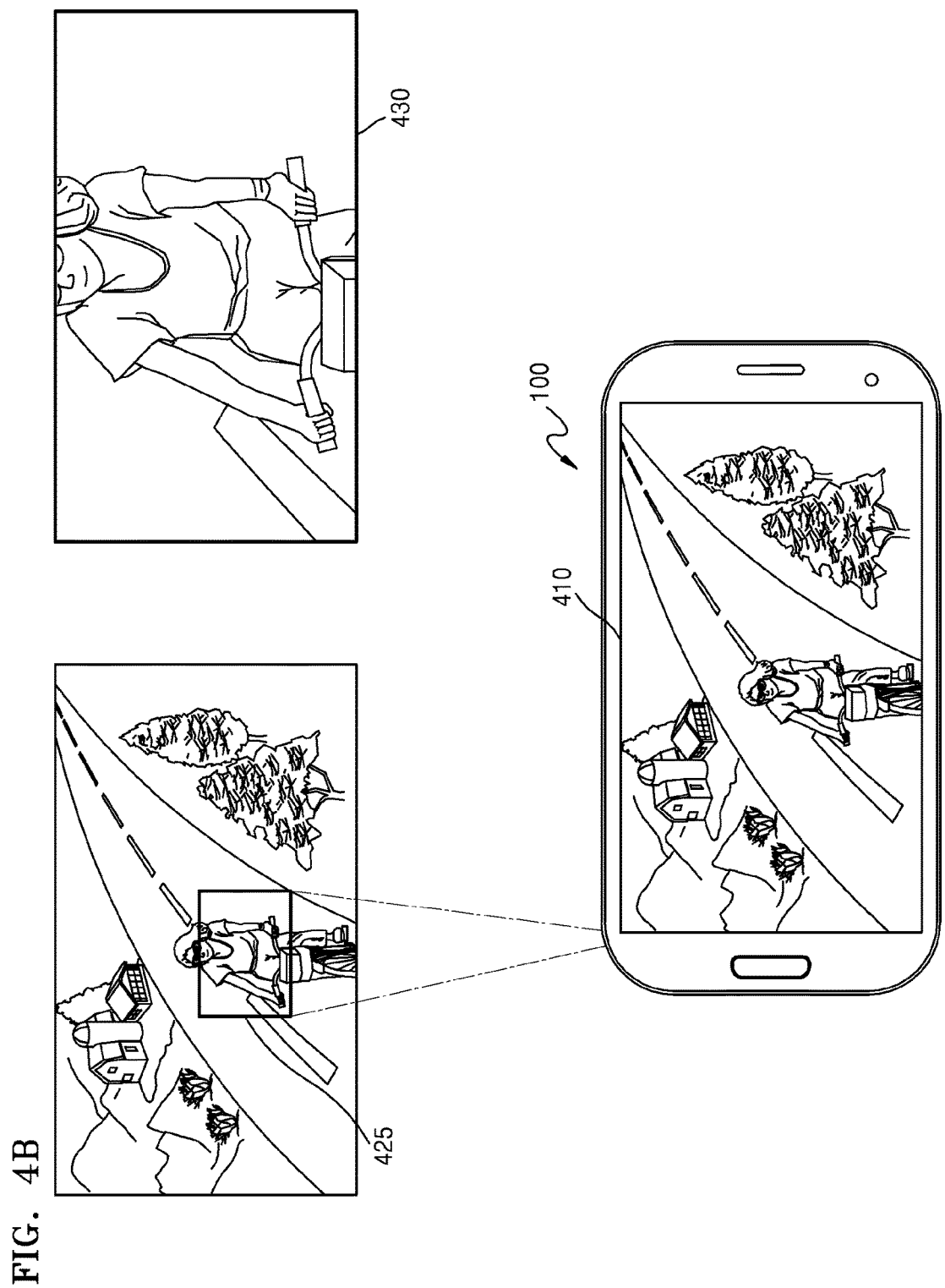

FIGS. 4A and 4B are diagrams for describing a process by which the digital photographing apparatus 100 determines a main image, according to an exemplary embodiment.

The digital photographing apparatus 100 acquires a wide-angle image 410 as shown in FIG. 4A by using a first camera 20. The digital photographing apparatus 100 acquires a telephoto image 430 of FIG. 4B by using a second camera 30.

According to an exemplary embodiment, a lens included in the first camera 20 of the digital photographing apparatus 100 may be a wide-angle lens having a focal length of from about 10 mm to about 30 mm. A lens included in the second camera 30 of the digital photographing apparatus 100 may be a telephoto lens having a focal length of from about 30 mm to about 500 mm. The lenses included in the first camera 20 and the second camera 30 of the digital photographing apparatus 100 may be lenses capable of adjusting the focal lengths.

FIG. 4A shows that the digital photographing apparatus 100 acquires a wide-angle image 410 including a main subject 401 located at a distance of about 0.5 m and a background around the main subject 401 by using the first camera, according to an exemplary embodiment. The lens included in the first camera 20 of the digital photographing apparatus 100 may have a focal length of about 10 mm.

FIG. 4B shows that the digital photographing apparatus 100 acquires a telephoto image 430 corresponding to a region 425 including a portion of the main subject 401 located at a distance of about 0.5 m by using the second camera, according to an exemplary embodiment. The lens included in the second camera 30 of the digital photographing apparatus 100 may have a focal length of about 30 mm.

For example, as shown in FIG. 4B, if the main subject 401 deviates from the telephoto image 430 acquired from the second camera 30, the digital photographing apparatus 100 may determine the wide-angle image 410 shown in FIG. 4A as the main image.

More specifically, as shown in FIG. 4B, if the main subject 401 is located within a short distance (e.g., a distance of about 0.5 m or less) from the digital photographing apparatus 100, the telephoto image 430 may enlarge the region 425 including a portion of the main subject 401. In this case, the digital photographing apparatus 100 may determine the wide-angle image 410 shown in FIG. 4A as the main image to show the entire main subject 401.

If the digital photographing apparatus 100 determines the wide-angle image 410 as the main image, the digital photographing apparatus 100 displays the wide-angle image 410 as a live-view image.

The digital photographing apparatus 100 according to an exemplary embodiment may acquire motion information of the main subject 401 based on the wide-angle image 410 and the telephoto image 430.

The digital photographing apparatus 100 repeats, at intervals, determining one of the wide-angle image 410 and the telephoto image 430 as the main image based on the motion information of the main subject 401. For example, if the main subject 401 moves away from the digital photographing apparatus 100 after the wide-angle image 410 is determined as the main image, the digital photographing apparatus 100 changes the main image from the wide-angle image 410 to the telephoto image 430.

The digital photographing apparatus 100 according to an exemplary embodiment may predict a moving direction of the main subject 401 based on the motion information of the main subject 401 and thus change the determined main image to the other image based on the prediction.

A way for the digital photographing apparatus 100 to change the determined main image to the other image will be described in detail with reference to FIGS. 6 through 8B.

FIG. 5A is a diagram for describing a depth map 520 acquired by the digital photographing apparatus 100 according to an exemplary embodiment.

Referring to FIG. 5A, the digital photographing apparatus 100 acquires the depth map 520 corresponding to an image 510 shown in a left portion of FIG. 5A. The image 510 may be an image including a region of interest (ROI). The ROI may be determined as a region including a main subject 501. The depth map 520 of FIG. 5A may indicate information associated with a distance from a position where an image is acquired to a surface of a subject (i.e., from the digital photographing apparatus 100 to the subjects in the image 510).

According to an exemplary embodiment, the digital photographing apparatus 100 acquires the depth map 520 based on a wide-angle image and a telephoto image that are obtained using a first camera 20 and a second camera 30.

There may be a parallax between the acquired wide-angle image and telephoto image due to a position difference between the first camera and the second camera. The digital photographing apparatus 100 may calculate a distance between subjects in an image by using a parallax between the wide-angle image and the telephoto image. The digital photographing apparatus 100 generates the depth map 520 based on the calculated distance between the subjects.

Referring to FIG. 5A, the depth map 520 indicates distance-related information by using a brightness of a pixel. For example, in the depth map 520, the brightest portion 521 is the closest portion and the next brightest portion 523 is the next closest portion. In the depth map 520, the darkest portion 525 is the farthest portion.

As mentioned above, the digital photographing apparatus 100 may express the depth map 520 by using brightness information or may use different colors according to different distances. There may be various ways to express the depth map 520 without being limited to the foregoing example.

According to an exemplary embodiment, because the depth map 520 uses a parallax between a wide-angle image and a telephoto image, a region indicated by the depth map 520 may be a region commonly included in the wide-angle image and the telephoto image. That is, the region indicated by the depth map 520 may correspond to the telephoto image.

Referring to FIG. 5A, the digital photographing apparatus 100 determines the brightest portion 521 in the depth map 520 to be a portion corresponding to the main subject 501. In an exemplary embodiment, the digital photographing apparatus 100 may determine the main subject 501 based on a user input.

According to an exemplary embodiment, if a region indicated by the depth map 520 corresponds to the telephoto image, the digital photographing apparatus 100 determines that the telephoto image faithfully shows the main subject 501.

Figure 5B:
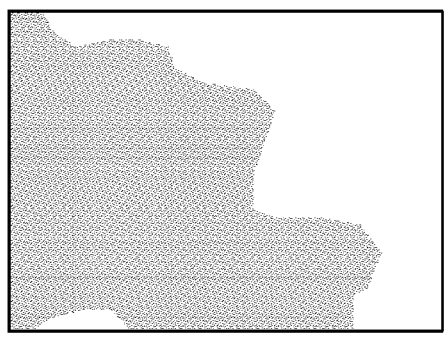
FIG. 5B is a diagram for describing a depth map acquired by the digital photographing apparatus according to an exemplary embodiment.

FIG. 5B is a diagram for describing a depth map 530 acquired by the digital photographing apparatus 100 according to an exemplary embodiment.

When the depth map 530 is expressed with bright colors as a whole, it may be determined that the digital photographing apparatus 100 is excessively close to the subject.

According to an exemplary embodiment, if a region indicated by the depth map 530 corresponds to the telephoto image, the digital photographing apparatus 100 may determine that the telephoto image shows only a portion of the main subject 501. In this case, the digital photographing apparatus 100 may determine the wide-angle image as the main image.

Figure 6:
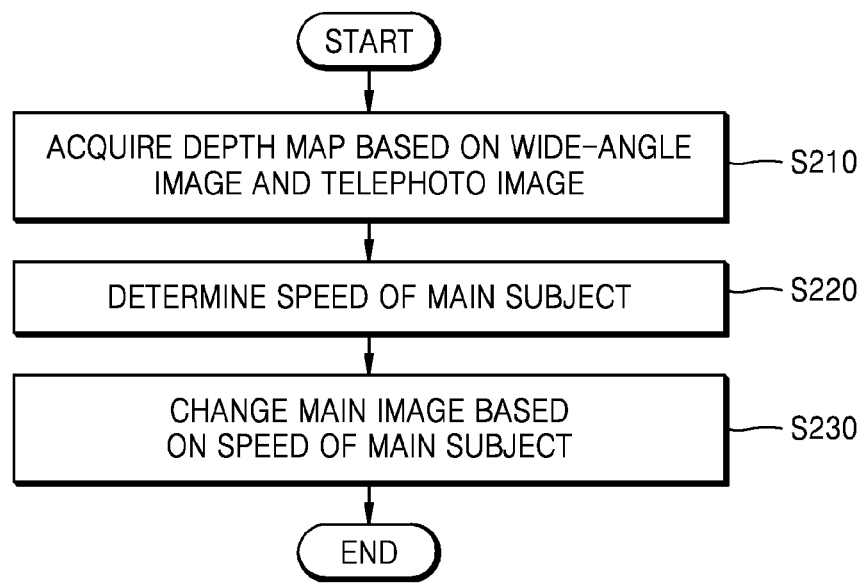
FIG. 6 is a flowchart of a method of operating the digital photographing apparatus according to an exemplary embodiment.

FIG. 6 is a flowchart of a method of operating the digital photographing apparatus 100 according to an exemplary embodiment.

In operation S210, the digital photographing apparatus 100 acquires a depth map based on a wide-angle image and a telephoto image.

Herein, the wide-angle image may be an image acquired from the first camera of the digital photographing apparatus 100 and the telephoto image may be an image acquired from the second camera of the digital photographing apparatus 100. The digital photographing apparatus 100 may acquire a depth map by using a parallax between the wide-angle image and the telephoto image, which is caused by a position difference between the first camera and the second camera.

In operation S220, the digital photographing apparatus 100 determines a speed of a main subject based on the depth map.

The digital photographing apparatus 100 may determine the speed of the main subject based on the depth map and thus predict the position of the main subject over time.

In operation S230, the digital photographing apparatus 100 changes a main image based on the speed of the main subject.

For example, the digital photographing apparatus 100 may change the main image from the wide-angle image to the telephoto image if the speed of the main subject is slower than a predetermined speed. That is, if the main subject moves slower than the predetermined speed, the digital photographing apparatus 100 displays the telephoto image as the main image because the cameras of the digital photographing apparatus 100 may be able to capture the main subject with ease.

However, if the speed of the main subject increased beyond the predetermined speed, the digital photographing apparatus 100 changes the main image from the telephoto image to the wide-angle image because the first camera capturing the wide-angle image will be better suited to capture a fasting moving main subject.

Figure 7A:
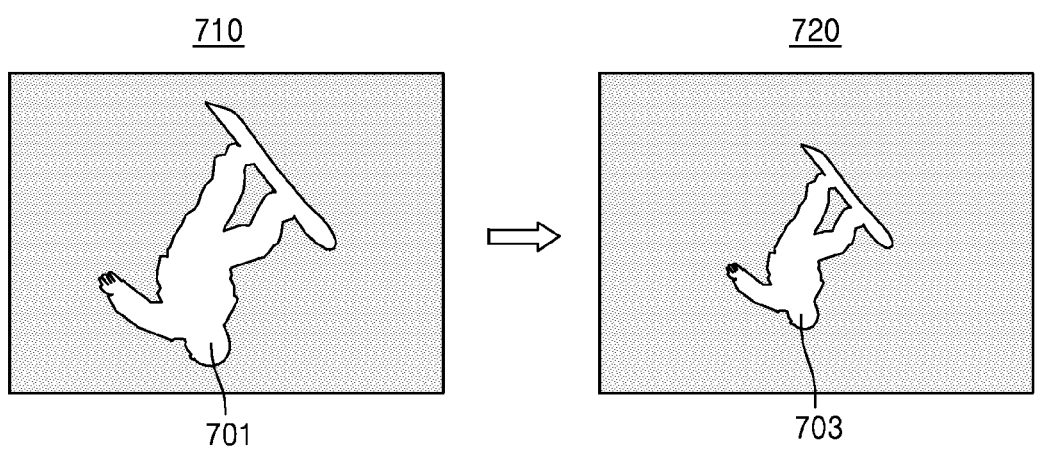
FIG. 7A is a diagram for describing a process by which the digital photographing apparatus acquires motion information of a main subject according to an exemplary embodiment.

FIG. 7A is a diagram for describing a process by which the digital photographing apparatus 100 acquires motion information of the main subject, according to an exemplary embodiment.

Referring to FIG. 7A, a first depth map 710 may be a depth map at a first point in time, which includes a first ROI 701. A second depth map 720 may be a depth map at a second point in time, which includes a second ROI 703. The first ROI 701 and the second ROI 703 may be regions including the main subject.

According to an exemplary embodiment, the digital photographing apparatus 100 acquires motion information of the main subject based on changes in at least one of a size, a brightness, and a color of the first and the second ROIs 701 and 703 in the depth maps 710 and 720, respectively.

Comparing the first depth map 710 with the second depth map 720 with reference to FIG. 7A, over time from the first point in time to the second point in time, the first ROI 701 is reduced in size. The digital photographing apparatus 100 may determine, based on a feature that the second ROI 703 at the second point in time is smaller than the first ROI 701 at the first point in time, that a distance of the main subject from the digital photographing apparatus 100 increases.

If the depth map indicates a distance using a brightness of a pixel, the digital photographing apparatus 100 may determine, based on a feature that the first ROI 701 in the depth map becomes darker, that a distance between the digital photographing apparatus 100 and the main subject increases.

Figure 7B:
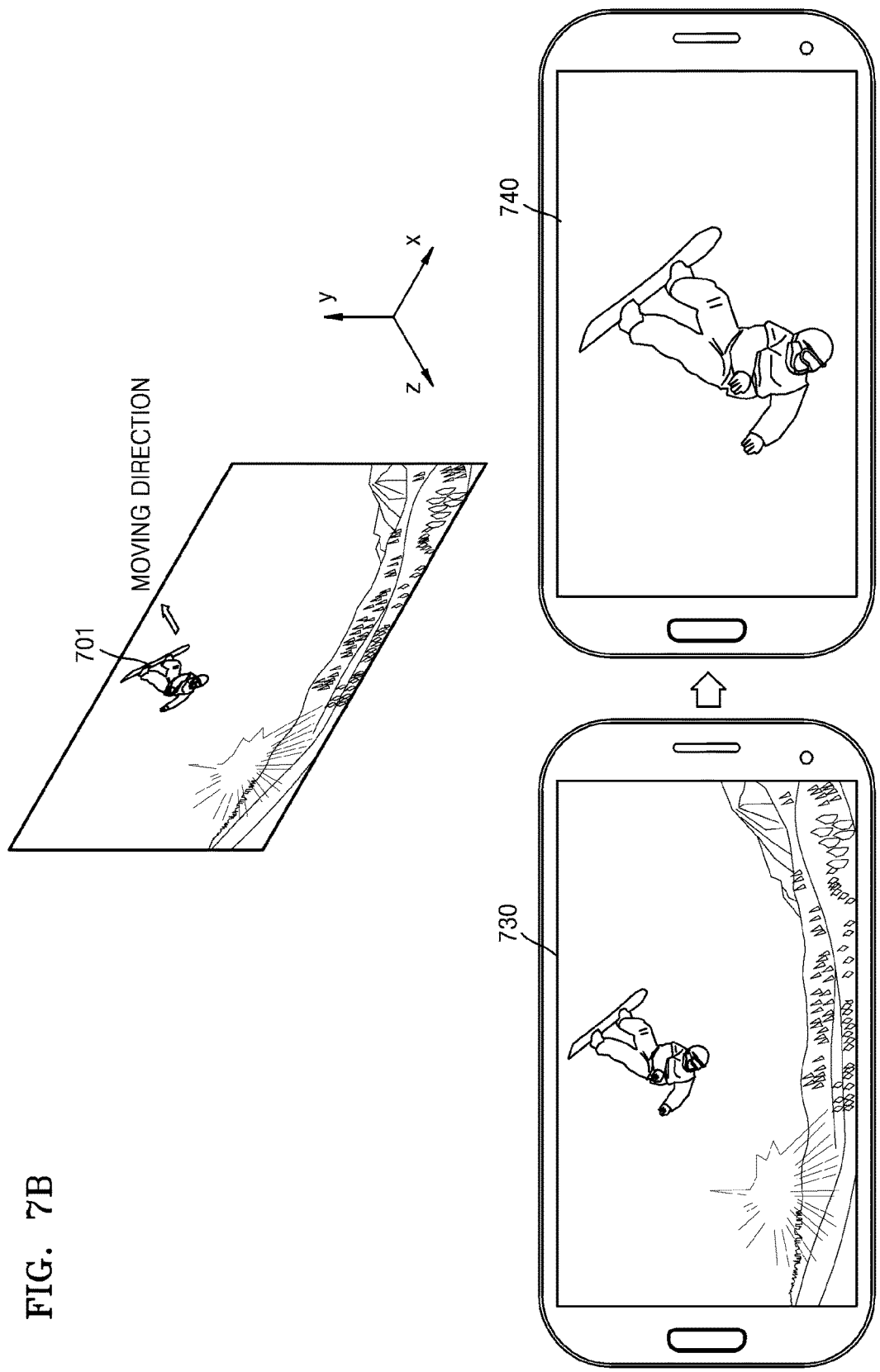
FIG. 7B is a diagram for describing a process by which the digital photographing apparatus changes a main image based on a moving direction of a main subject, according to an exemplary embodiment.

FIG. 7B is a diagram for describing a process by which the digital photographing apparatus 100 changes the main image based on a moving direction of the main subject, according to an exemplary embodiment.

Referring to FIG. 7B, the digital photographing apparatus 100 may determine that a moving direction of the main subject is in the −z direction. That is, the digital photographing apparatus 100 may determine that the main subject moves away from the digital photographing apparatus 100. The digital photographing apparatus 100 may change the main image from a wide-angle image 730 to a telephoto image 740.

Figure 8A:
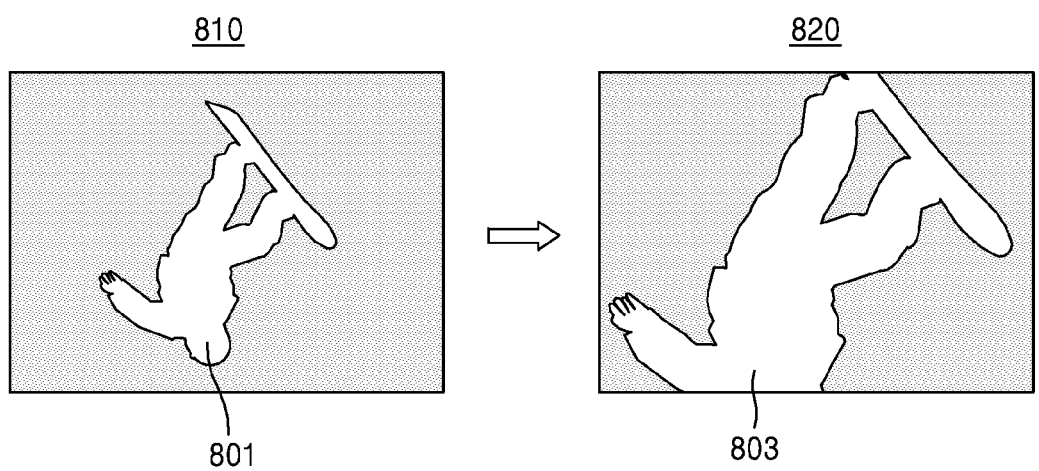
FIG. 8A is a diagram for describing a process by which the digital photographing apparatus acquires motion information of a main subject according to an exemplary embodiment.

FIG. 8A is a diagram for describing a process by which the digital photographing apparatus 100 acquires motion information of a main subject according to an exemplary embodiment.

Referring to FIG. 8A, a first depth map 810 may be a depth map at a first point in time, which includes a first ROI 801. A second depth map 820 may be a depth map at a second point in time, which includes a second ROI 803. The first ROI 801 may be a region including a main subject.

As described with reference to FIG. 7A, the digital photographing apparatus 100 may acquire motion information of the main subject based on changes in at least one of a size, a brightness, and a color of the first and the second ROIs 801 and 803 in the depth maps 810 and 820, respectively.

Comparing the first depth map 810 with the second depth map 820 with reference to FIG. 8A, over time from the first point in time to the second point in time, the first ROI 801 is enlarged. The digital photographing apparatus 100 may determine, based on a feature that the second ROI 803 at the second point in time is larger than the first ROI 801 at the first point in time, that a distance of the main subject from the digital photographing apparatus 100 decreases.

If the depth map indicates a distance using a brightness of a pixel, the digital photographing apparatus 100 may determine, based on a feature that the first ROI 801 in the depth map becomes brighter, that a distance between the digital photographing apparatus 100 and the main subject decreases.

Figure 8B:
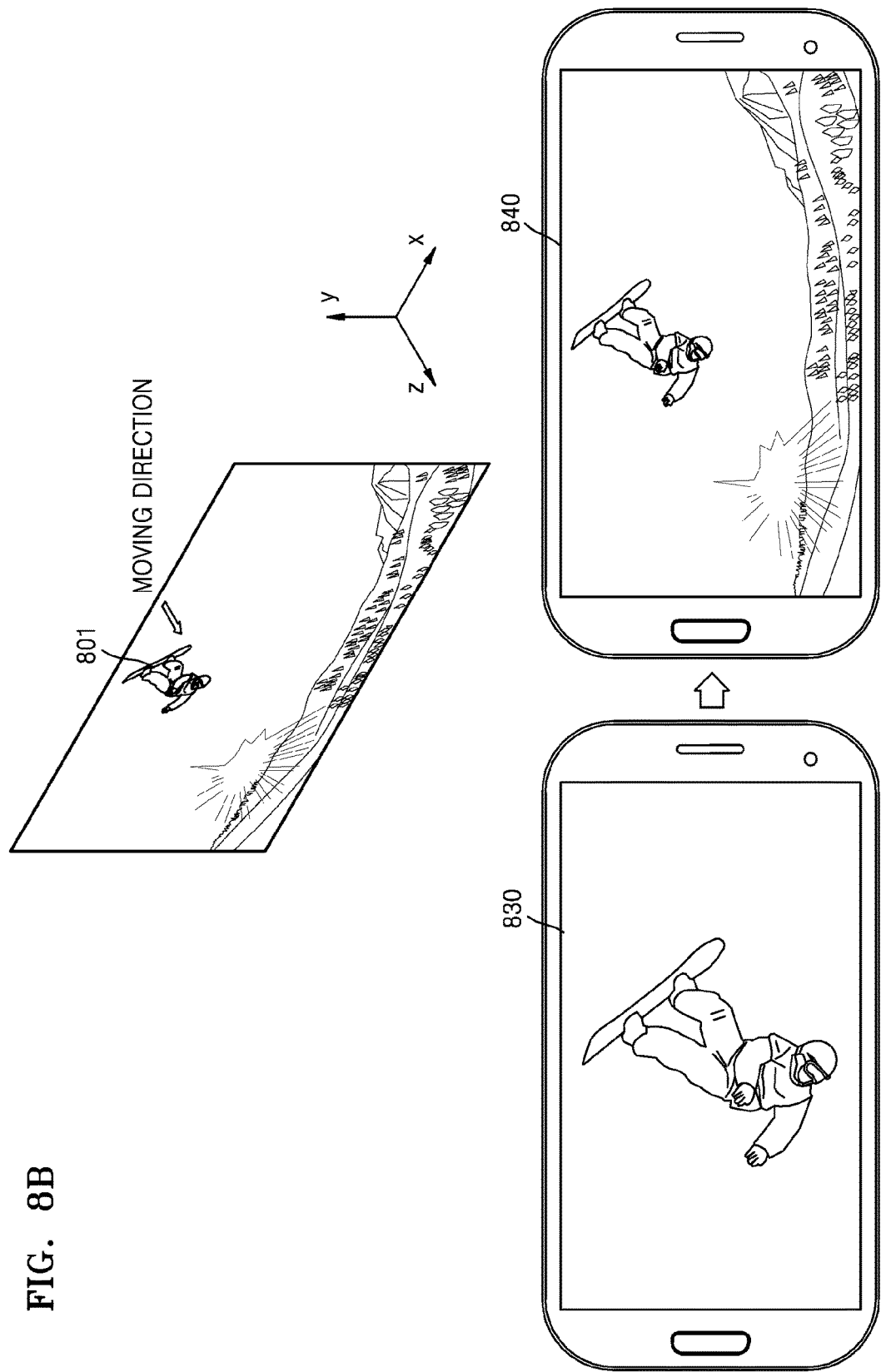
FIG. 8B is a diagram for describing a process by which the digital photographing apparatus changes a main image based on a moving direction of a main subject, according to an exemplary embodiment.

FIG. 8B is a diagram for describing a process by which the digital photographing apparatus 100 changes a main image based on a moving direction of a main subject, according to an exemplary embodiment.

Referring to FIG. 8B, the digital photographing apparatus 100 may determine that a moving direction of the main subject is in the +z direction. That is, the digital photographing apparatus 100 may determine that the main subject moves toward the digital photographing apparatus 100. The digital photographing apparatus 100 may change the main image from a telephoto image 830 to a wide-angle image 840.

FIG. 9 is a diagram for describing a process by which the digital photographing apparatus 100 changes a direction of the second camera 30 based on a moving direction of a main subject, according to an exemplary embodiment.

According to an exemplary embodiment, the digital photographing apparatus 100 controls the second camera 30 to move to a position corresponding to a position of a main subject 901. The digital photographing apparatus 100 tracks the main subject 901 so that the main subject 901 does not deviate from a first telephoto image 910 when the main subject 901 moves. The second camera 30 may move up, down, to the left, or to the right by using a piezo motor or may be tilted.

The digital photographing apparatus 100 acquires motion information of the main subject 901 based on a depth map if the main subject 901 moves. The digital photographing apparatus 100 determines a moving direction of the main subject 901 based on the motion information of the main subject 901.

More specifically, the digital photographing apparatus 100 acquires a telephoto image of a first region 910 at a first point in time. Thereafter, the digital photographing apparatus 100 controls the second camera 30 to move in a direction corresponding to the moving direction of the main subject 901. Thus, the digital photographing apparatus 100 acquires a telephoto image of a second region 920 at a second point in time.

Although it is described as an example with reference to FIG. 9 that the second camera 30 moves, the first camera 20 may also move according to the design intent.

Figure 10:
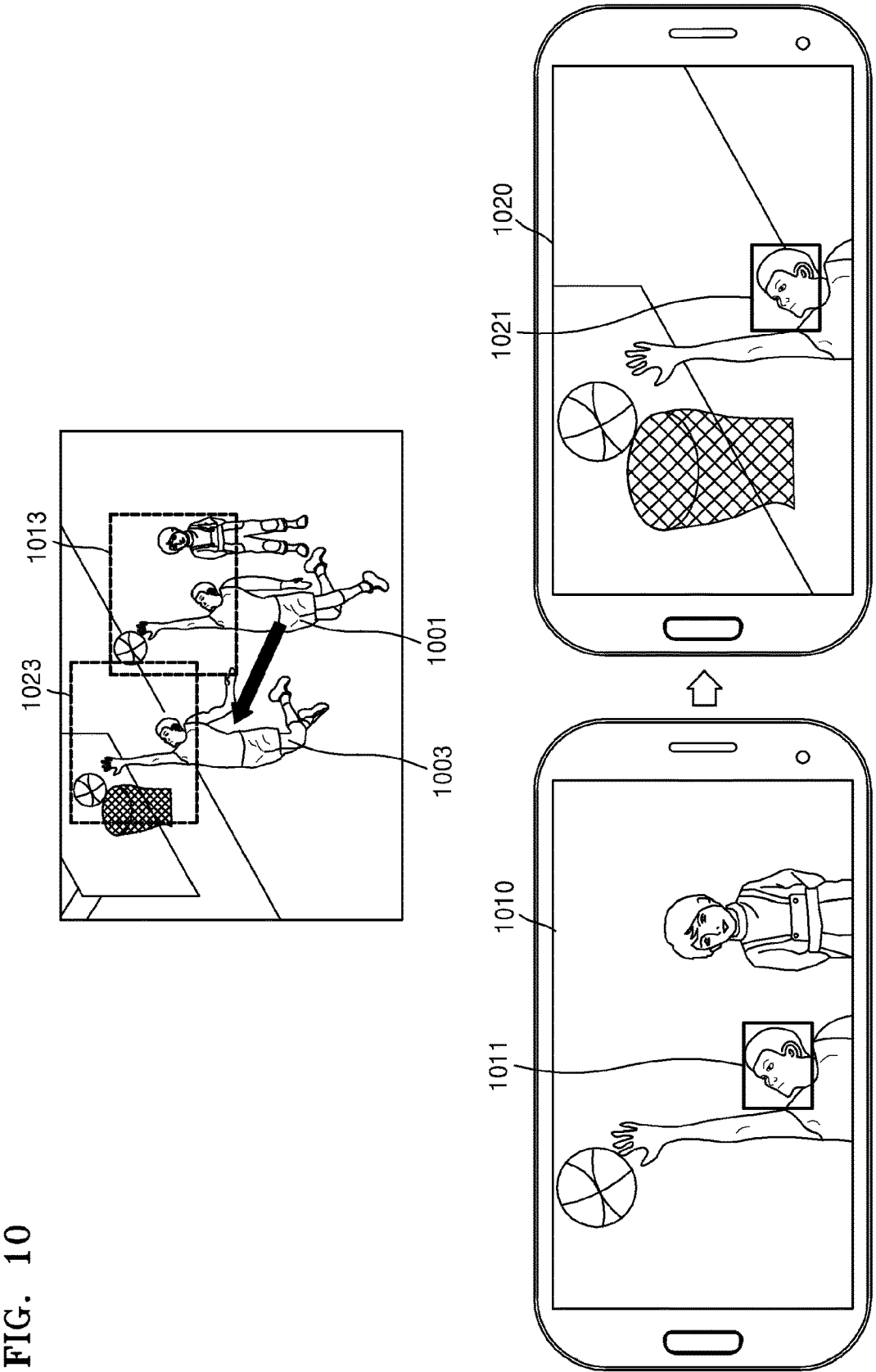
FIG. 10 is a diagram showing a screen displayed by the digital photographing apparatus as a main subject moves, according to an exemplary embodiment.

FIG. 10 is a diagram showing a screen displayed by the digital photographing apparatus 100 as a main subject 1001 moves, according to an exemplary embodiment.

According to an exemplary embodiment, the digital photographing apparatus 100 acquires a first telephoto image 1010 including a moving main subject 1001 at a first point in time. The first telephoto image 1010 may be an image acquired by photographing a first region 1013.

The digital photographing apparatus 100 controls the second camera 30 to move in a direction corresponding to a moving direction of the main subject 1001. Thus, the digital photographing apparatus 100 acquires a second telephoto image 1020 including a moving main subject 1003 at a second point in time. The second telephoto image 1020 may be an image acquired by photographing a second region 1023.

According to an exemplary embodiment, the digital photographing apparatus 100 recognizes a position of a face 1011 of the main subject 1001 included in the first telephoto image 1010. The digital photographing apparatus 100 displays a face 1021 of the main subject to be at a corresponding position in the second telephoto image 1020.

Figure 11:
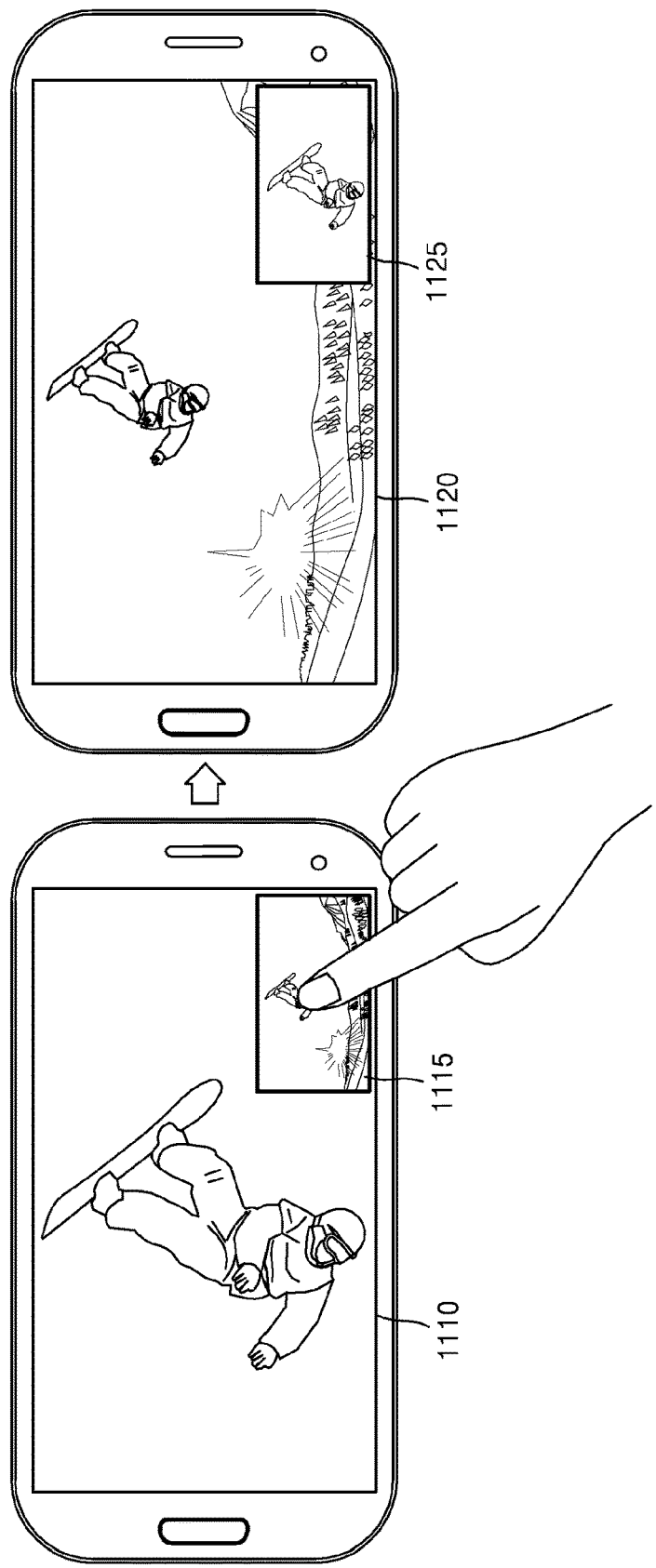
FIG. 11 is a diagram showing a screen on which the digital photographing apparatus displays a main image and a sub image, according to an exemplary embodiment.

FIG. 11 is a diagram showing a screen on which the digital photographing apparatus 100 displays a main image and a sub image, according to an exemplary embodiment.

According to an exemplary embodiment, while displaying one of a wide-angle image and a telephoto image as a main image, the digital photographing apparatus 100 displays the other of the wide-angle image and the telephoto image as a sub image, overlappingly with the main image.

For example, if a telephoto image 1110 is a main image and a wide-angle image 1115 is a sub image, the digital photographing apparatus 100 displays the telephoto image 1110 on the entire screen and at the same time, displays the wide-angle image 1115 as a picture-in-picture (PIP) image overlappingly with the telephoto image 1110.

According to an exemplary embodiment, the digital photographing apparatus 100 switches a position of an image displayed on the entire screen with a position of a PIP image, based on a user input for selecting the wide-angle image 1115. That is, based on the user input, the digital photographing apparatus 100 displays a wide-angle image 1120 on the entire screen and at the same time, displays a telephoto image 1125 as a PIP image overlappingly with the wide-angle image 1120.

According to an exemplary embodiment, the digital photographing apparatus 100 receives a user input for selecting the sub image 1115 at the time of image capturing. In this case, the digital photographing apparatus 100 may change a live-view image displayed on the entire screen. The digital photographing apparatus 100 may switch between the main image 1110 and the sub image 1115.

According to an exemplary embodiment, the digital photographing apparatus 100 receives a user input for selecting the sub image 1115 at the time of moving-image playback. In this case, the digital photographing apparatus 100 may change an image displayed on the entire screen from the telephoto image 1110 to the wide-angle image 1120. At this time, the digital photographing apparatus 100 may change only the image displayed on the entire screen without switching between the main image 1110 and the sub image 1115.

Figure 12:
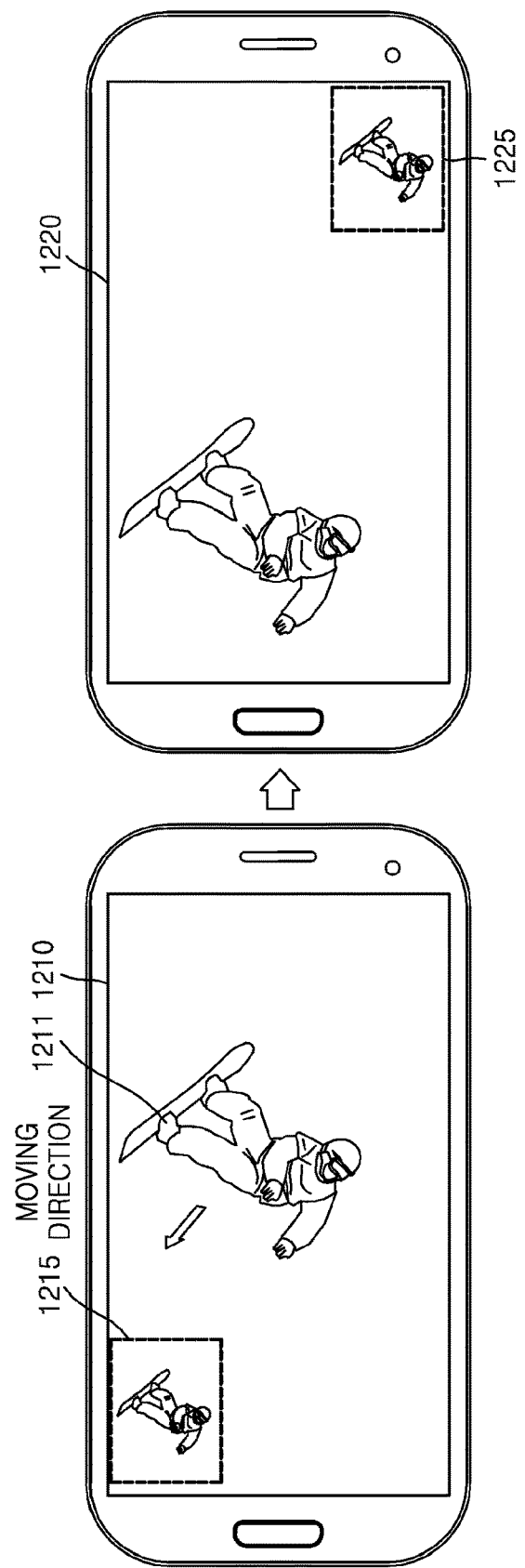
FIG. 12 is a diagram showing a screen on which the digital photographing apparatus displays a main image and a sub image, according to another exemplary embodiment.

FIG. 12 is a diagram illustrating a screen on which the digital photographing apparatus 100 displays a main image and a sub image, according to an exemplary embodiment.

The digital photographing apparatus 100 displays a main image 1210 on the entire screen, and at the same time, displays a sub image 1215 overlappingly with the main image 1210. Here, the digital photographing apparatus 100 determine a position at which to display the sub image 1215 based on a position of a main subject 1211 in the main image 1210.

According to an exemplary embodiment, the digital photographing apparatus 100 acquires motion information of the main subject 1211 based on a wide-angle image and a telephoto image. The digital photographing apparatus 100 determines a moving direction of the main subject 1211 in the main image 1210 based on the acquired motion information of the main subject 1211.

If the moving direction of the main subject 1211 is moving toward an upper left portion of the screen of the digital photographing apparatus 100 as shown in FIG. 12, the digital photographing apparatus 100 displays a sub image 1225 in a lower right portion of a main image 1220.

According to an exemplary embodiment, the digital photographing apparatus 100 displays the sub image 1225 in a position that does not obstruct the main subject in the main image 1220. In an exemplary embodiment, the digital photographing apparatus 100 may display the sub image 1225 in a position that is farthest from the position of the main subject in the main image 1220.

Figure 13:
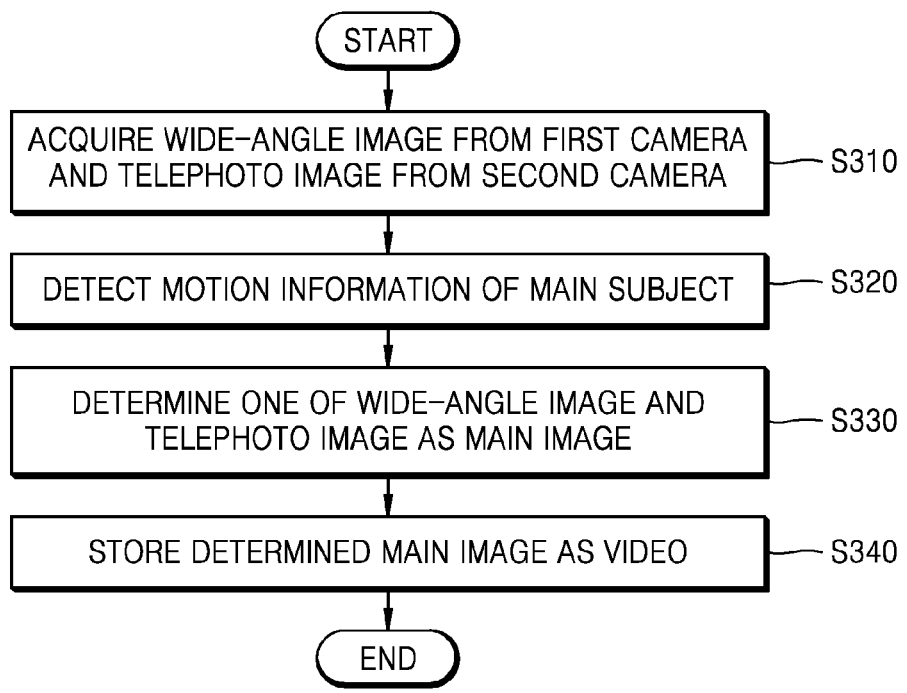
FIG. 13 is a flowchart of a method of operating the digital photographing apparatus, according to an exemplary embodiment.

FIG. 13 is a flowchart of a method of operating the digital photographing apparatus 100, according to an exemplary embodiment.

In operation S310, the digital photographing apparatus 100 acquires a wide-angle image from a first camera and a telephoto image from a second camera.

The wide-angle image according to an exemplary embodiment may be an image including a main subject. The telephoto image may show the main subject enlarged (i.e., "zoomed-in") compared to in the wide-angle image.

In operation S320, the digital photographing apparatus 100 detects/acquires motion of the main subject based on the wide-angle image and the telephoto image.

In detail, according to an exemplary embodiment, the digital photographing apparatus 100 acquires a depth map based on the wide-angle image and the telephoto image. The digital photographing apparatus 100 acquires motion information from the motion of the main subject based on the depth map.

In operation S330, the digital photographing apparatus 100 determines one of the wide-angle image and the telephoto image as the main image based on the motion information of the main subject.

According to an exemplary embodiment, the digital photographing apparatus 100 determines one of the wide-angle image and the telephoto image, which is capable of displaying the main subject in a desirable composition/view, as the main image.

In operation S340, the digital photographing apparatus 100 stores the determined main image as video.

The digital photographing apparatus 100 stores main images determined by repeating operations S310 through S330 at intervals as video.

According to an exemplary embodiment, the digital photographing apparatus 100 stores a video stream including images determined as main images in a memory (not shown).

The memory may be a memory that is embedded in or removable from the digital photographing apparatus 100 or a memory included in an external device capable of communicating with the digital photographing apparatus 100.

Figure 14:
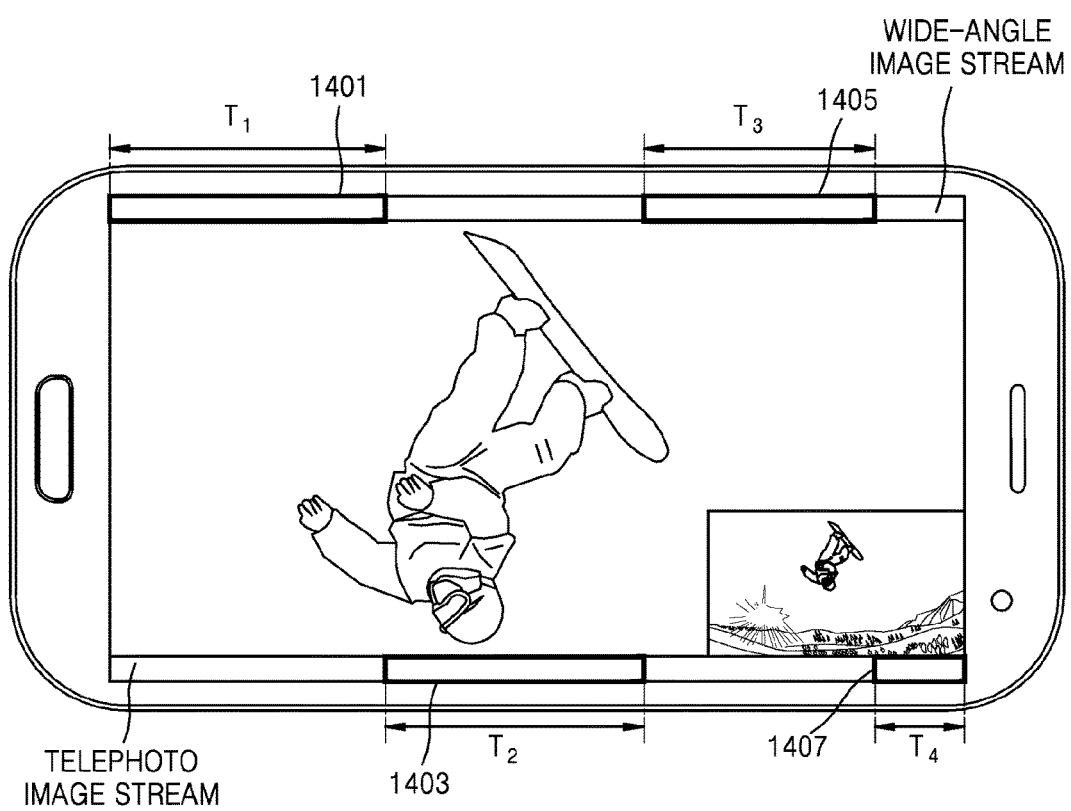
FIG. 14 is a diagram for describing a process by which the digital photographing apparatus stores a main image as video, according to an exemplary embodiment.

FIG. 14 is a diagram for describing a process by which the digital photographing apparatus 100 stores a main image as video, according to an exemplary embodiment.

The digital photographing apparatus 100 simultaneously acquires a wide-angle image and a telephoto image by using a first camera and a second camera, respectively, in a video capturing mode.

Referring to FIG. 14, the digital photographing apparatus 100 determines a wide-angle image as a main image during a time T1, determines a telephoto image as the main image during a time T2, determines a wide-angle image as the main image during a time T3, and determines a telephoto image as the main image during a time T4.

The digital photographing apparatus 100 may store the entire wide-angle image stream and the entire telephoto image stream obtained during video capturing.

The digital photographing apparatus 100 may store video including only the main images in a memory.

More specifically, the digital photographing apparatus 100 may store video, which includes a wide-angle image stream 1401 acquired during the time T1, a telephoto image stream 1403 acquired during the time T2, a wide-angle image stream 1405 acquired during the time T3, and a wide-angle image stream 1407 acquired during the time T4, in the memory.

According to an exemplary embodiment, the digital photographing apparatus 100 may store video including image streams determined as main images while capturing video by using the first camera and the second camera.

That is, the digital photographing apparatus 100 may edit the main image streams 1401, 1403, 1405, and 1407 expressing the main subject live or in a proper composition and store video, while capturing video.

According to an exemplary embodiment, when playing video, the digital photographing apparatus 100 may play the main images 1401 and 1405 including the wide-angle image stream at a higher speed than an X1 speed and play the main images 1403 and 1407 including the telephoto image stream at the X1 speed.

Figure 15:
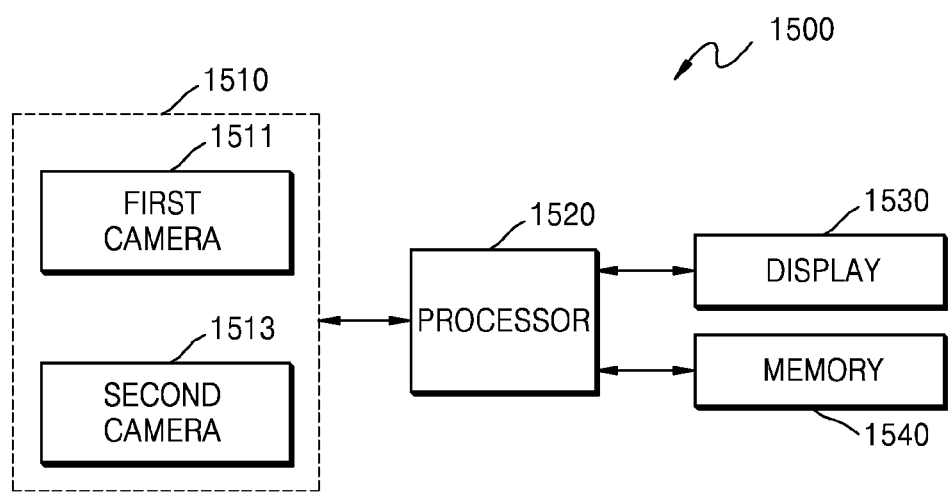
FIG. 15 is a block diagram of the digital photographing apparatus according to an exemplary embodiment.

FIG. 15 is a block diagram of a digital photographing apparatus 1500 according to an exemplary embodiment.

According to an exemplary embodiment, the digital photographing apparatus 1500 may include a camera 1510, a processor 1520, a display 1530, and a memory 1540.

The camera 1510 may include a plurality of cameras. Herein, the camera refers to an element that includes at least one lens and image sensor and acquires an image signal from the image sensor.

The camera 1510 may include a first camera 1511 and a second camera 1513. The first camera 1511 acquires a wide-angle image including a main subject. The second camera 1513 acquires a telephoto image zoomed in on the main subject.

The first camera 1511 may capture an image showing a wider range than the second camera 1513. That is, the first camera 1511 may provide a wider FOV than the second camera 1513.

The first camera 1511 acquires a wide-angle image including subjects at various distances as well as the main subject. The first camera 1511 may provide, for example, an FOV ranging from about 30° to about 80°. The first camera 1511 may acquire an image having a deep DOF.

The second camera 1513 acquires a telephoto image including the main subject. The second camera 1513 may provide, for example, a FOV ranging from about 10° to about 30°. The second camera 1513 acquires an image having a shallow depth.

The second camera 1513 is movable to track the main subject as the main subject moves. For example, the second camera 1513 moves up, down, to the left, or to the right by using a piezo motor or is tilted.

According to an exemplary embodiment, the first camera 1511 may include a wide-angle lens and the second camera 1513 may include a telephoto lens.

The wide-angle lens included in the first camera 1511 may have a shorter focal length than the telephoto lens included in the second camera 1513. Herein, the focal length refers to a distance from a center of a lens to an image sensor. The wide-angle lens included in the first camera 1511 may be a lens having a focal length of from about 10 mm to about 30 mm. The telephoto lens included in the second camera 1513 may be a lens having a focal length of from about 30 mm to about 500 mm. For example, the focal lengths of the wide-angle lens and the telephoto lens described above are merely examples, and may be determined variously according to the design intent.

The processor 1520 controls the camera 1510, the display 1530, and the memory 1540 connected thereto, and performs various data processing and operations. The processor 1520 may be implemented by a system-on-a-chip (SoC). The processor 1520 may further include a graphics processing unit (GPU) and/or an image signal processor.

The processor 1520 detects/acquires motion information of the main subject based on the wide-angle image and the telephoto image.

According to an exemplary embodiment, the processor 1520 acquires a depth map based on the wide-angle image and the telephoto image acquired using the first camera 1511 and the second camera 1513.

The processor 1520 acquires information about global motion and local motion of the wide-angle image and the telephoto image. Thus, the processor 1520 may acquire a depth map after correcting blur caused by motion of the main subject or hand-shaking in the wide-angle image and the telephoto image.

The processor 1520 acquires motion information of the main subject based on the depth map. According to an exemplary embodiment, the motion information may include information about a position and a size of the main subject.

The processor 1520 determines one of the wide-angle image and the telephoto image as the main image based on the motion information of the main subject.

The processor 1520 changes the main image from one of the wide-angle image and the telephoto image to the other image based on the motion information of the main subject. More specifically, the processor 1520 acquires the speed of the main subject based on the wide-angle image and the telephoto image, and changes the main image from one of the wide-angle image and the telephoto image to the other image based on the speed of the main subject.

If the speed of the main subject is directed toward the digital photographing apparatus 1500, the processor 1520 changes the main image from the telephoto image to the wide-angle image. On the other hand, the processor 1520 may change the main image from the wide-angle image to the telephoto image if the speed of the main subject is directed far away from the digital photographing apparatus 1500.

The processor 1520 detects/acquires the main subject based on the depth map. The processor 1520 controls the second camera 1513 to move to a position corresponding to the main subject.

The processor 1520 determines a position at which to display a sub image based on a position of the main subject in the main image. Herein, the sub image may be one of the wide-angle image and the telephoto image, which is other than the main image.

The display 1530 displays the main image as a live-view image. The display 1530 displays the sub image overlappingly with the main image.

The memory 1540 stores the main image as video. For example, the memory 1540 may include an internal memory or an external memory.

The digital photographing apparatus 1500 may determine one of the wide-angle image and the telephoto image as the main image without a user's manipulation, and may determine switchover between the wide-angle image and the telephoto image. Thus, the digital photographing apparatus 1500 acquires an image expressing live motion of the main subject while automatically switching between the wide-angle image and the telephoto image.

Figure 16:
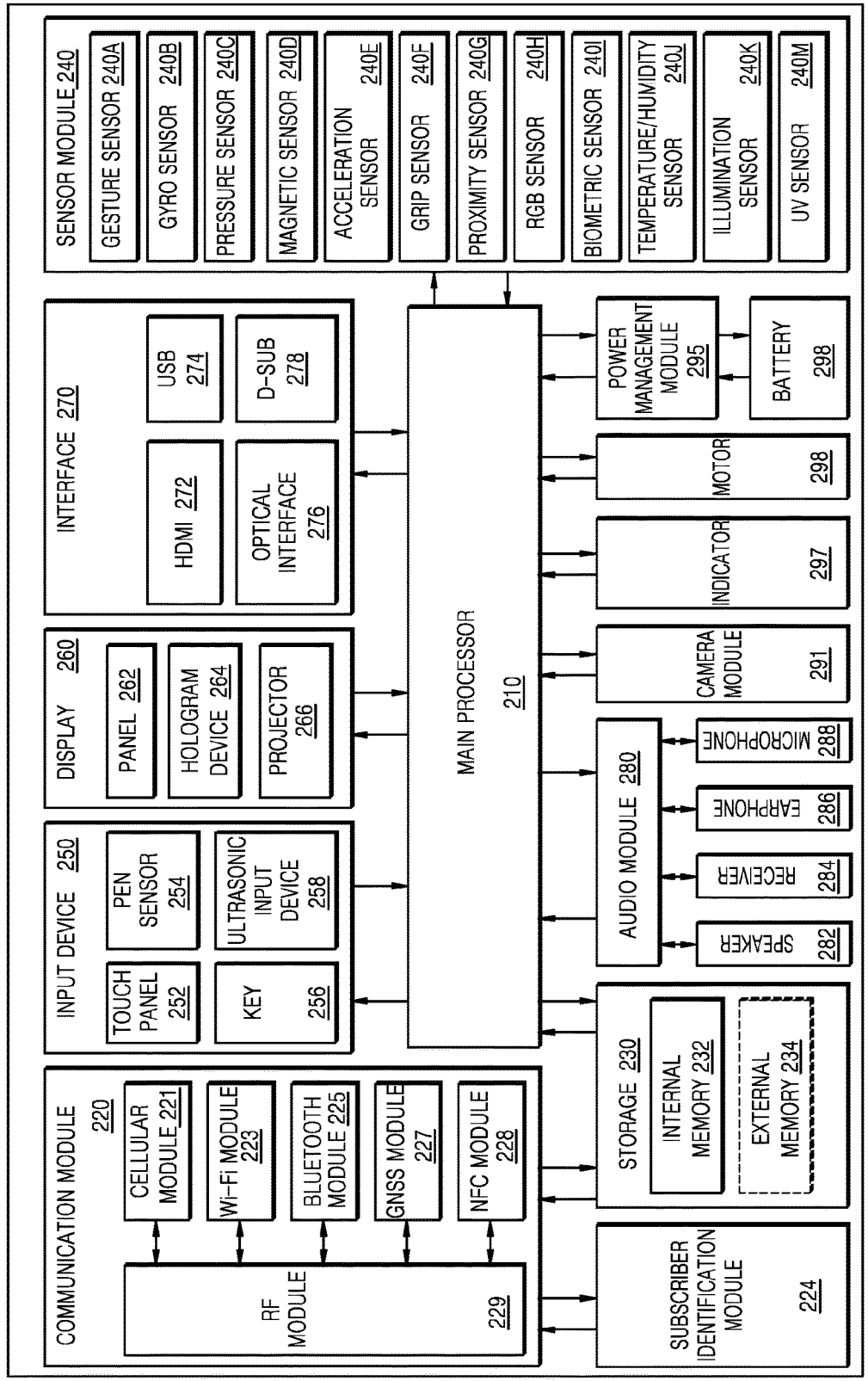
FIG. 16 is a block diagram of the digital photographing apparatus according to an exemplary embodiment.

FIG. 16 is a block diagram of a digital photographing apparatus 1600 according to an exemplary embodiment.

The digital photographing apparatus 1600 may include all or part of the elements of the digital photographing apparatus 1500 of FIG. 15.

The digital photographing apparatus 1600 according to the present exemplary embodiment may include at least one processor (e.g., application processor) 210, a communication module 220, a subscriber identification module 224, a storage 230, a sensor module 240, an input device 250, a display 260, an interface 270, an audio module 280, a camera module 291, a power management module 295, a battery 296, an indicator 297, and a motor 298.

The main processor 210 may execute an operating system or an application program to control a plurality of hardware or software components connected thereto, and may perform a variety of data processing and arithmetic operations. The main processor 210 may be implemented by a system on chip (SoC). According to the present exemplary embodiment, the main processor 210 may further include a GPU and/or an image signal processor. The main processor 210 may include at least some (e.g., a cellular module 221) of the elements illustrated in FIG. 16. The main processor 210 may load a command or data received from at least one of other elements (e.g., non-volatile memory), process the loaded command or data, and store various data in the non-volatile memory.

The main processor 210 according to an exemplary embodiment may include the processor 1520 illustrated in FIG. 15.

The communication module 220 may include the cellular module 221, a wireless fidelity (Wi-Fi) module 223, a Bluetooth module 225, a global navigation satellite system (GNSS) module 227 (e.g., a GPS module, a Glonass module, a BeiDou module, or a Galileo module), a near-field communication (NFC) module 228, and a radio frequency (RF) module 229.

The storage 230 may include an internal memory 232 or an external memory 234. The internal memory 232 may include at least one selected from among a volatile memory (e.g., dynamic random access memory (DRAM), static RAM (SRAM), synchronous DRAM (SDRAM), etc.), a non-volatile memory (e.g., one time programmable read-only memory (OTPROM), programmable ROM (PROM), erasable and programmable ROM (EPROM, etc.), electrically erasable and programmable ROM (EEPROM), mask ROM, flash ROM, flash memory (e.g., NAND flash, NOR flash, etc.), hard disk drive (HDD), and solid state drive (SSD).

The external memory 234 may include a flash drive, for example, compact flash (CF), secure digital (SD), micro secure digital (micro-SD), mini secure digital (mini-SD), extreme digital (xD), multi-media card (MMC), or memory stick. The external memory 234 may be functionally and/or physically connected to the digital photographing apparatus 1600 via various interfaces.

The sensor module 240 may measure physical quantities or detect an operating state of the digital photographing apparatus 1600 and convert measured or detected information into an electrical signal. The sensor module 240 may include at least one selected from among a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illumination sensor 240K, and an ultraviolet (UV) sensor 240M. The sensor module 240 may further include a control circuit configured to control at least one sensor included therein. In some exemplary embodiments, the digital photographing apparatus 100c may further include a processor configured to control the sensor module 240, as a part of the processor 210 or separately from the processor 210, so that the sensor module 240 is controlled when the processor 210 is in a sleep state.

According to an exemplary embodiment, by using the gyro sensor 240b, the acceleration sensor 240E, and the like, information about global motion and local motion of a wide-angle image and a telephoto image may be acquired.

The input device 250 may include a touch panel 252, a (digital) pen sensor 254, a key 256, or an ultrasonic input device 258. The touch panel 252 may be at least one selected from among a capacitive touch panel, a resistive touch panel, an infrared touch panel, and an ultraviolet touch panel. In addition, the touch panel 252 may further include a control circuit. The touch panel 252 may further include a tactile layer configured to provide a tactile response to a user.

The (digital) pen sensor 254 may be a part of the touch panel 252 or may include a separate recognition sheet. The key 256 may include a physical button, an optical key, or a keypad. The ultrasonic input device 258 may detect an ultrasonic wave generated by an input tool through a microphone 288 and check data corresponding to the detected ultrasonic wave.

The display 260 may include a panel 262, a hologram device 264, or a projector 266. The panel 262 may be implemented to be flexible, transparent, or wearable. The panel 262 and the touch panel 252 may be configured as one module.

The interface 270 may include high-definition multimedia interface (HDMI) 272, universal serial bus (USB) 274, optical interface 276, or D-subminiature (D-sub) 278.

The audio module 280 may perform bidirectional conversion between a sound and an electrical signal. The audio module 280 may be configured to process sound information input or output through a speaker 282, a receiver 284, an earphone 286, or the microphone 288.

The camera module 291 may be configured to capture a still image and video. According to an exemplary embodiment, the camera module 291 may include one or more image sensors (e.g., a front sensor or a rear sensor), a lens, an image signal processor (ISP), or a flash (e.g., an LED or a xenon lamp, etc.).

The camera module 291 may include a plurality of cameras, for example, a first camera and a second camera.

Each of the first camera and the second camera may include a lens (not shown), and an image sensor (not shown). The first camera may acquire a wide-angle image including a main subject, and the second camera may acquire a telephoto image zooming in on the main subject.

The first camera may capture an image showing a wider range than the second camera. That is, the first camera may provide a wider FOV than the second camera.

The power management module 295 may be configured to manage the power of the digital photographing apparatus 1600. According to an exemplary embodiment, the power management module 295 may include a power management integrated circuit (PMIC), a charger integrated circuit (IC), or a battery or fuel gauge. The PMIC may use a wired and/or wireless charging method. The battery gauge may be configured to measure a residual capacity, a charged voltage, a current, or a temperature of the battery 296.

The indicator 297 may be configured to display specific states of all or part (e.g., the main processor 210) of the elements of the digital photographing apparatus 1600, for example, booting states, message states, or charging states. The motor 298 may be configured to convert an electrical signal into a mechanical vibration and generate a vibration or haptic effect.

The elements described in the present disclosure may be configured by one or more components, and the names of the elements may be changed according to the type of the digital photographing apparatus. According to various exemplary embodiments, the digital photographing apparatus may be configured to include at least one of the elements described in the present disclosure, some elements may be omitted, or additional components may be further included. Some of the elements of the digital photographing apparatus according to various exemplary embodiments may be combined into one entity and perform the same functions as the previous elements prior to the combination.

Figure 17:
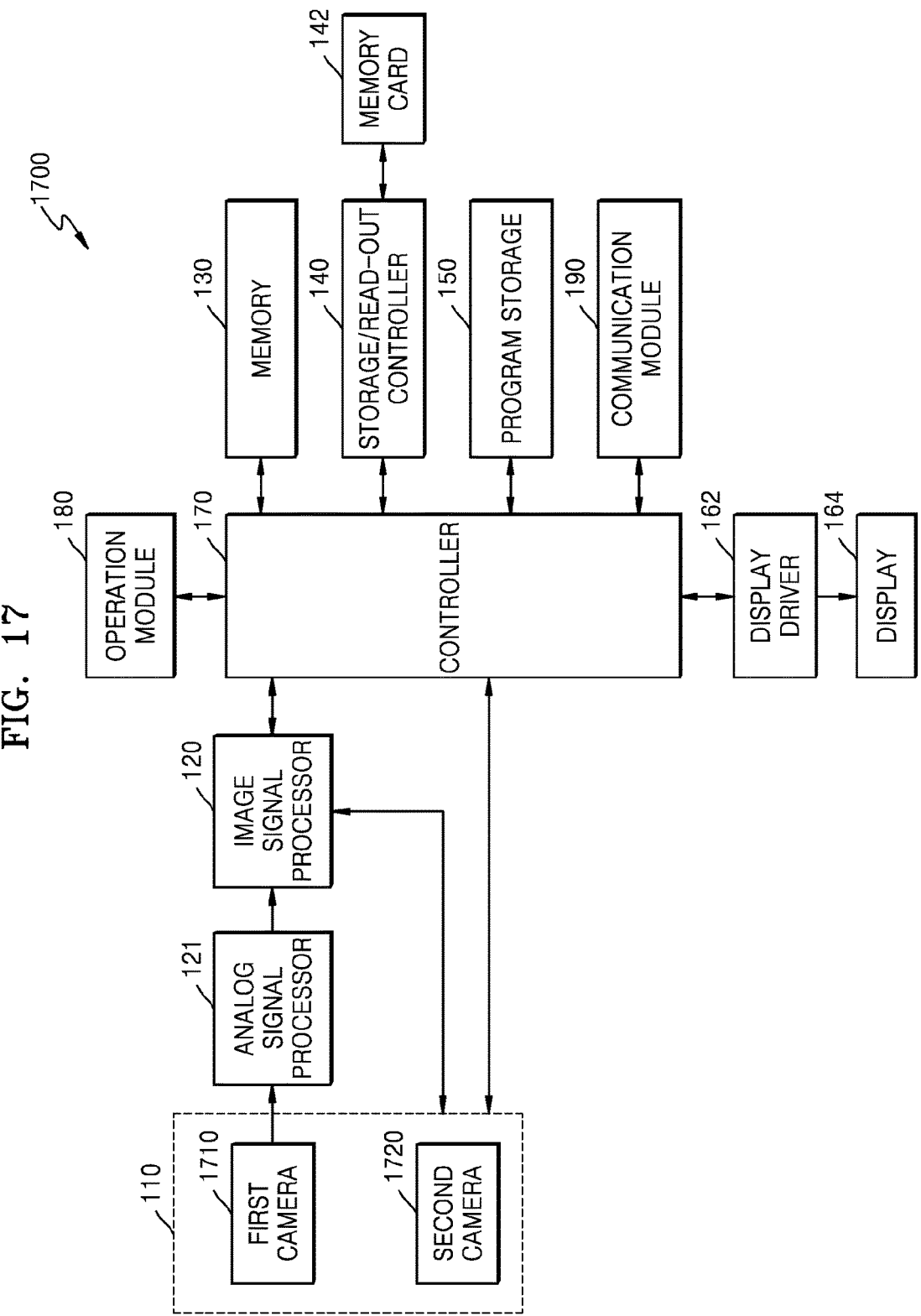
FIG. 17 is a block diagram of the digital photographing apparatus according to an exemplary embodiment.

FIG. 17 is a block diagram of a digital photographing apparatus 1700 according to an exemplary embodiment. The digital photographing apparatus 1700 may include all elements of the digital photographing apparatus 1500 shown in FIG. 15 and the digital photographing apparatus 1600 shown in FIG. 16, or only some of the elements.

The digital photographing apparatus 1700 according to the present exemplary embodiment may include an imager 110, an image signal processor 120, an analog signal processor 121, a memory 130, a storage/read-out controller 140, a memory card 142, a program storage 150, a display driver 162, a display 164, a controller 170, an operation module 180, and a communication module 190.

The controller 170 may control an overall operation of the digital photographing apparatus 1700. The controller 170 may provide control signals to a lens driver 112, an aperture driver 115, and an image sensor controller 119, so as to control operations of the elements of the imager 110.

The imager 110 may be configured to generate an electric signal from incident light.

The imager 110 may include a first camera 1710 and a second camera 1720. The first camera 1710 may acquire a wide-angle image including a main subject, and the second camera 1720 may acquire a telephoto image zooming in on the main subject.

The first camera 1710 may capture an image showing a wider range than the second camera 1720. That is, the first camera 1710 may provide a wider FOV than the second camera 1720.

Each of the first camera 1710 and the second camera 1720 may include a lens (not shown), and an image sensor (not shown). Subject light passing through the lens may form a subject image on a light-receiving surface of the image sensor. The image sensor may be a charge-coupled device (CCD) image sensor or a complementary metal-oxide semiconductor image sensor (CIS) configured to convert an optical signal into an electrical signal.

The analog signal processor 121 may perform noise reduction, gain control, waveform shaping, and analog-to-digital conversion on an analog signal provided from the imager 110.

The image signal processor 120 may perform a specific function on an image data signal processed by the analog signal processor 121. For example, for image quality enhancement and special effects, the image signal processor 120 may perform image signal processing, such as noise reduction, gamma correction, color filter array interpolation, color matrix, color correction, and color enhancement, white balancing, luminance smoothing, and color shading, with respect to input image data. The image signal processor 120 may compress the input image data into an image file, or may reconstruct the image data from the image file. An image compression format may be reversible or irreversible. For example, a still image may be compressed into a Joint Photographic Experts Group (JPEG) format or a JPEG 2000 format. In the case of recording a video, a plurality of frames may be compressed into a video file in accordance with the Moving Picture Experts Group (MPEG) standard. For example, an image file may be generated in accordance with the exchangeable image file format (Exif) standard.

The image signal processor 120 may generate a video file from an imaging signal generated by the image sensor 118. The imaging signal may be a signal that is generated by the image sensor 118 and is then processed by the analog signal processor 121. The image signal processor 120 may generate frames to be included in a video file from an imaging signal, code the frames in accordance with an appropriate standard, for example, MPEG4, H.264/AVC, or windows media video (WMV), compress a video, and generate a video file by using the compressed video. The video file may be generated in various formats, such as mpg, mp4, 3gpp, avi, asf, or mov.

Image data output from the image signal processor 120 may be input to the storage/read-out controller 140 directly or through the memory 130. The storage/read-out controller 140 may store the image data in the memory card 142 automatically or according to a signal input by the user. In addition, the storage/read-out controller 140 may read data related to an image from an image file stored in the memory card 142 and input the data to the display 164 through the memory 130 or another path so as to display the image on the display 164. The memory card 142 may be detachably or permanently attached to the digital photographing apparatus 1700. For example, the memory card 142 may be a flash memory card such as a secure digital (SD) card.

In addition, the image signal processor 120 may perform sharpness processing, chromatic processing, blurring processing, edge emphasis processing, image interpretation processing, image recognition processing, image effect processing, and the like. The image recognition processing may include face recognition processing and scene recognition processing. In addition, the image signal processor 120 may perform image signal processing so as to display image data on the display 164. For example, the image signal processor 120 may perform luminance level adjustment, color correction, contrast adjustment, contour emphasis adjustment, screen splitting, character image generation, and image synthesis.

A signal processed by the image signal processor 120 may be input to the controller 170 directly or through the memory 130. In this case, the memory 130 may operate as a main memory of the digital photographing apparatus 1700 and may temporarily store information necessary during the operation of the image signal processor 120 or the controller 170. The program storage 150 stores programs such as an operating system and an application system for driving the digital photographing apparatus 1700.

In addition, the digital photographing apparatus 1700 may include the display 164 to display an operating state of the digital photographing apparatus 1700 or image information acquired by the digital photographing apparatus 1700. The display 164 may provide visual information and/or auditory information to a user. In order to provide the visual information, the display 164 may include an LCD panel or an OLED panel. In addition, the display 164 may include a touch screen configured to recognize a touch input.

The display driver 162 may provide a driving signal to the display 164.

The controller 170 may process an input image signal and control the components of the digital photographing apparatus 100b according to the processed image signal or an external input signal. The controller 170 may be one or more processors. The processors may be implemented by an array of a plurality of logic gates, or may be implemented by a combination of a general-purpose microprocessor and a memory that stores a program executable in the general-purpose microprocessor. In addition, it will be obvious to a person with ordinary skill in the art that the one or more processors may be implemented by other types of hardware.

The controller 170 may generate control signals for controlling autofocusing, zoom adjustment, focus adjustment, automatic exposure compensation, and the like by executing the program stored in the program storage 150 or by using a separate module, provide the control signals to the aperture driver 115, the lens driver 112, and the image sensor controller 119, and control the overall operations of the elements of the digital photographing apparatus 1700, such as a shutter and a stroboscope.

In addition, the controller 170 may be connected to an external monitor and perform image signal processing so that an image signal input from the image signal processor 120 is displayed on the external monitor. The controller 170 may transmit the processed image data to the external monitor so that an image corresponding to the processed image data is displayed on the external monitor.

The controller 170 detects/acquires motion information of the main subject based on the wide-angle image and the telephoto image.

According to an exemplary embodiment, the controller 170 acquires a depth map based on the wide-angle image and the telephoto image acquired from the first camera 1710 and the second camera 1720.

The controller 170 acquires information about global motion and local motion of the wide-angle image and the telephoto image. Thus, the controller 170 acquires a depth map after correcting blur caused by motion of the main subject or hand-shaking in the wide-angle image and the telephoto image.

The controller 170 acquires the motion information of the main subject based on the depth map. According to an exemplary embodiment, the motion information may include information about a position and a size of the main subject.

The controller 170 determines one of the wide-angle image and the telephoto image as a main image based on the motion information of the main subject.

The controller 170 switches the main image from one of the wide-angle image and the telephoto image to the other image, based on the motion information of the main subject.

According to various exemplary embodiments, when an image is captured using a plurality of cameras, the image may be captured with a switchover among the plurality of cameras without a user's manipulation.

According to various embodiments, by using a plurality of cameras, a motion of a main subject may be accurately tracked and an image including the main subject may be acquired.

The exemplary embodiments set forth herein may be embodied as program instructions that can be executed by various computing means and recorded on a non-transitory computer-readable recording medium. Examples of the non-transitory computer-readable recording medium may include program instructions, data files, and data structures solely or in combination. The program instructions recorded on the non-transitory computer-readable recording medium may be specifically designed and configured for the inventive concept, or may be well known to and usable by one of ordinary skill in the field of computer software. Examples of the non-transitory computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device specially configured to store and execute program instructions (e.g., a ROM, a random access memory (RAM), a flash memory, etc.). Examples of the program instructions may include not only machine language codes prepared by a compiler but also high-level codes executable by a computer by using an interpreter.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A digital photographing apparatus comprising:
   a first camera configured to capture a wide-angle image comprising a main subject;
   a second camera configured to capture a telephoto image having the main subject zoomed in with respect to the wide-angle image;
   a display configured to display a main image, wherein the main image is one of the wide-angle image and the telephoto image; and a processor configured to acquire motion information of the main subject based on the wide-angle image and the telephoto image, determine one of the wide-angle image and the telephoto image as the main image to be displayed on the display based on the motion information, and based on the main image being changed between the wide-angle image and the telephoto image, update the main image displayed on the display.

2. The digital photographing apparatus of claim 1, wherein the processor is configured to determine a velocity of the main subject based on the wide-angle image and the telephoto image and configured to determine the main image between the wide-angle image and the telephoto image based on the velocity of the main subject.

3. The digital photographing apparatus of claim 2, wherein the processor is configured to determine the wide-angle image being the main image, if the velocity of the main subject is greater than a predetermined speed.

4. The digital photographing apparatus of claim 2, wherein the processor is configured to determine the telephoto image being the main image, if the velocity of the main subject is less than a predetermined speed.

5. The digital photographing apparatus of claim 1, wherein the processor is configured to generate a depth map based on the wide-angle image and the telephoto image and configured to acquire the motion information of the main subject based on the depth map.

6. The digital photographing apparatus of claim 1, wherein the processor is configured to control the second camera to move to a position corresponding to a position of the main subject.

7. The digital photographing apparatus of claim 1 wherein the display is configured to display the main image as a live-view image.

8. The digital photographing apparatus of claim 7, wherein the display is configured to display a sub image corresponding to the other one of the wide-angle image and the telephoto image, the sub image overlapping with the main image on the display.

9. The digital photographing apparatus of claim 8, wherein the processor is configured to determine a position of the sub image on the display, based on the position of the main subject in the main image.

10. The digital photographing apparatus of claim 1, further comprising a memory configured to store the main image as video.

11. A method of operating a digital photographing apparatus comprising a first camera and a second camera, the method comprising:
capturing, by the first camera, a wide-angle image comprising a main subject;
capturing, by the second camera, a telephoto image having the main subject zoomed in with respect to the wide-angle image;
displaying, on a display, a main image, wherein the main image is one of the wide-angle image and the telephoto image;
acquiring motion information of the main subject based on the wide-angle image and the telephoto image;
determining one of the wide-angle image and the telephoto image as the main image to be displayed on the display, based on the motion information; and
based on the main image changed between the wide-angle image and the telephoto image, updating the main image displayed on the display.

12. The method of claim 11, further comprising:
determining a velocity of the main subject based on the wide-angle image and the telephoto image; and
determining the main image between the wide-angle image and the telephoto image based on the velocity of the main subject.

13. The method of claim 12, wherein the determining the main image comprises determining the wide-angle image being the main image, if the velocity of the main subject is greater than a predetermined speed.

14. The method of claim 12, wherein the determining the main image comprises determining the telephoto image being the main image, if the velocity of the main subject is less than a predetermined speed.

15. The method of claim 11, wherein the acquiring the motion information of the main subject comprises:
generating a depth map based on the wide-angle image and the telephoto image; and
acquiring the motion information of the main subject based on the depth map.

16. The method of claim 11, further comprising:
controlling the second camera to move to a position corresponding to a position of the main subject.

17. The method of claim 11, wherein the displaying comprises displaying the main image as a live-view image.

18. The method of claim 17, wherein the displaying the main image comprises displaying a sub image corresponding to the other one of the wide-angle image and the telephoto image, the sub image overlapping with the main image on a display.

19. The method of claim 18, wherein the displaying the sub image comprises determining a position of the sub image on the display, based on the position of the main subject in the main image.

20. The method of claim 11, further comprising:
storing the main image as video.

21. An image processing apparatus comprising:
a first camera configured to capture a first image including a subject;
a second camera configured to capture a second image including the subject, the first image having a wider field of view (FOV) than that of the second image;
a display configured to display a main image, wherein the main image is one of the first image and the second image; and
a processor configured to acquire motion information of the subject based on the first image and the second image, determine one of the first image and the second image as the main image to be displayed on the display based on the motion information, and based on the main image being changed between the first image and the second image, update the main image displayed on the display.

22. The image processing apparatus of claim 21, wherein the processor is configured to generate a depth map based on the first image and the second image and configured to acquire the motion information of the subject based on the depth map.

23. The image processing apparatus of claim 22, wherein the depth map comprises:
a first depth map generated at a first point in time; and
a second depth map generated at a second point in time, and
wherein the processor is configured to determine a first region of interest (ROI) having the subject at the first point in time and a second ROI having the subject at the second point in time from the depth map.

24. The image processing apparatus of claim 23, wherein the processor is configured to acquire the motion information based on comparison between the first ROI and the second ROI.

25. The image processing apparatus of claim 24, wherein the processor is configured to acquire the motion information based on at least one of comparison with respect to brightness of a pixel between the first and the second ROIs and comparison with respect to a size of the first ROI including the subject and a size of the second ROI including the subject.

26. The image processing apparatus of claim 21, wherein the processor is configured to determine the main image to be displayed amongst the first and the second images based on at least one of speed of the subject and a moving direction of the subject.

27. A method of operating an image processing apparatus comprising a first camera and a second camera, the method comprising:
  capturing, by the first camera, a first image including a subject;
  capturing, by the second camera, a second image including the subject, the first image having a wider field of view (FOV) than that of the second image;
  displaying, on a display, a main image, wherein the main image is one of the first image and the second image;
  acquiring motion information of the subject based on the first image and the second image;
  determining one of the first image and the second image as the main image to be displayed on the display, based on the motion information; and
  based on the main image changed between the first image and the second image, updating the main image displayed on the display.

28. The method of claim 27, wherein the acquiring the motion information comprises:
  generating a depth map based on the first image and the second image; and
  acquiring the motion information of the subject based on the depth map.

29. The method of claim 28, wherein the generating the depth map comprises:
  generating a first depth map at a first point in time; and
  generating a second depth map at a second point in time, and
  wherein the acquiring the motion information comprises determining a first region of interest (ROI) having the subject at the first point in time and a second ROI having the subject at the second point in time.

30. The method of claim 29, wherein the acquiring the motion information comprises acquiring the motion information based on comparison between the first ROI and the second ROI.

31. The method of claim 30, wherein the acquiring the motion information comprises acquiring the motion information based on at least one of comparison with respect to brightness of a pixel between the first and the second ROIs and comparison with respect to a size of the first ROI including the subject and a size of the second ROI including the subject.

32. The method of claim 27, wherein the determining the main image to be displayed comprises determining the main image to be displayed amongst the first and the second images based on at least one of speed of the subject and a moving direction of the subject.

\* \* \* \* \*